US012657441B2

(12) United States Patent (10) Patent No.: US 12,657,441 B2
Nishi et al. (45) Date of Patent: Jun. 16, 2026

(54) SPIKING NEURAL NETWORK DEVICE THAT UPDATES SYNAPTIC WEIGHT BASED ON OUTPUT FREQUENCY AND LEARNING METHOD OF SPIKING NEURAL NETWORK DEVICE

(71) Applicant: KABUSHIKI KAISHA TOSHIBA, Tokyo (JP)

(72) Inventors: Yoshifumi Nishi, Yokohama Kanagawa (JP); Kumiko Nomura, Tokyo (JP); Takao Marukame, Tokyo (JP); Koichi Mizushima, Kamakura Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 1225 days.

(21) Appl. No.: 17/007,331

(22) Filed: Aug. 31, 2020

(65) Prior Publication Data

US 2021/0279559 A1 Sep. 9, 2021

(30) Foreign Application Priority Data

Mar. 3, 2020 (JP) ................................. 2020-035917

(51) Int. Cl.
*G06N 3/063* (2023.01)
*G06N 3/047* (2023.01)
*G06N 3/08* (2023.01)

(52) U.S. Cl.
CPC ............. *G06N 3/063* (2013.01); *G06N 3/047* (2023.01); *G06N 3/08* (2013.01)

(58) Field of Classification Search
CPC .......... G06N 3/063; G06N 3/047; G06N 3/08; G06N 3/065; G06N 3/088; G06N 3/049; G06N 3/0495; G06N 3/0499; G06N 3/09
See application file for complete search history.

(56) References Cited

U.S. PATENT DOCUMENTS

2014/0365416 A1* 12/2014 Kim ...................... G11C 11/412
706/26
2018/0260696 A1* 9/2018 Suda ...................... G06N 3/049
(Continued)

FOREIGN PATENT DOCUMENTS

WO WO 2019/1254419 A1 6/2019

OTHER PUBLICATIONS

Boybat, I. et al., "Neuromorphic computing with multi-memristive synapses", https://www.nature.com/articles/s41467-018-04933-y (Year: 2018).*

(Continued)

*Primary Examiner* — Alexey Shmatov
*Assistant Examiner* — Devika S Maharaj
(74) *Attorney, Agent, or Firm* — Finnegan, Henderson, Farabow, Garrett & Dunner, LLP

(57) ABSTRACT

A spiking neural network device according to an embodiment includes a synaptic element, a neuron circuit, a determinator, a synaptic depressor, and a synaptic potentiator. The synaptic element has a variable weight and outputs, in response to input of a first spike signal, a synaptic signal having intensity adjusted in accordance with the weight. The neuron circuit outputs a second spike signal in a case where the synaptic signal is inputted and a predetermined firing condition for the synaptic signal is satisfied. The determinator determines whether or not the weight is to be updated on a basis of an output frequency of the second spike signal by the neuron circuit. The synaptic depressor performs depression operation for depressing the weight in a case where it is determined that the weight is to be updated. The synaptic potentiator performs potentiating operation for potentiating the weight.

9 Claims, 22 Drawing Sheets

(56) References Cited

U.S. PATENT DOCUMENTS

| | | | |
|---|---|---|---|
| 2018/0322384 A1* | 11/2018 | Augustine | ............. G06N 3/049 |
| 2019/0138900 A1* | 5/2019 | Linares-Barranco | .... G06N 3/08 |
| 2019/0213472 A1* | 7/2019 | Park | ...................... G06N 3/088 |

OTHER PUBLICATIONS

Sidler et al., "Unsupervised Learning Using Phase-Change Synapses and Complementary Patterns," International Symposium on Artificial Neural Networks, pp. 281-288 (2017).

Chicca et al., "Neuromorphic Electronic Circuits for Building Autonomous Cognitive Systems," IEEE Proc., 102:1367-88 (Sep. 2014).

T. Adachi et al., "A Memristor-based Synaptic Device having an Asymmetric STDP Time Window," IEICE Technical Report, vol. 1111, No. 106, pp. 65-70 (2011) and translation, 7 pages.

* cited by examiner

EACH SECTION INCLUDING 28 X 28 PIXELS

INITIAL STATE

EACH SECTION INCLUDING 28 X 28 PIXELS

AFTER LEARNING 60,000 TIMES

RECOGNITION RATE OF ABOUT 10%

EACH SECTION INCLUDING 28 X 28 PIXELS

SYNAPTIC NORMALIZATION
IMPLEMENTED

RECOGNITION RATE OF ABOUT 89%

FIG.9

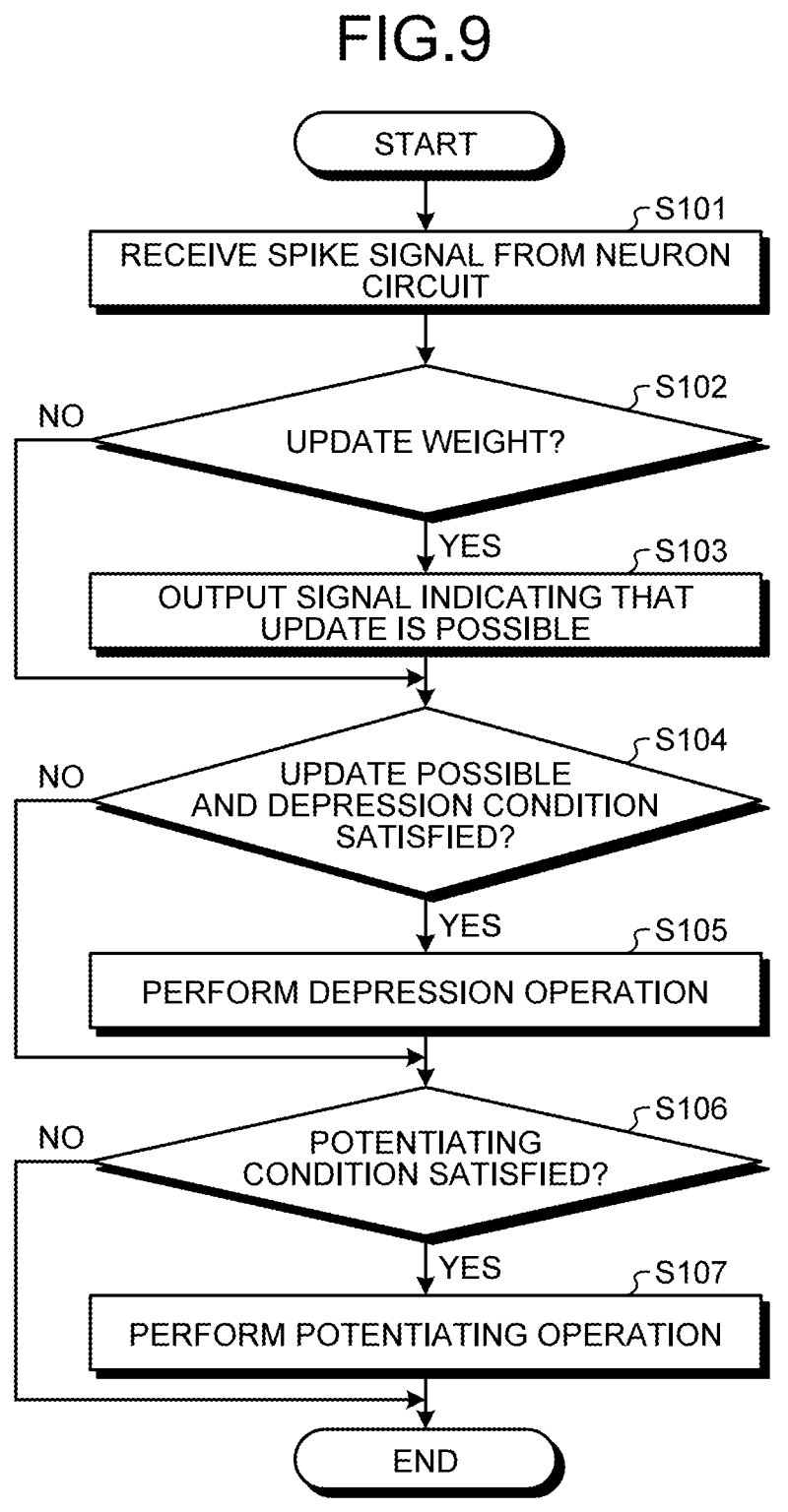

START

S101

RECEIVE SPIKE SIGNAL FROM NEURON CIRCUIT

S102

UPDATE WEIGHT?

NO

YES

S103

OUTPUT SIGNAL INDICATING THAT UPDATE IS POSSIBLE

S104

UPDATE POSSIBLE AND DEPRESSION CONDITION SATISFIED?

NO

YES

S105

PERFORM DEPRESSION OPERATION

S106

POTENTIATING CONDITION SATISFIED?

NO

YES

S107

PERFORM POTENTIATING OPERATION

END

AFTER LEARNING 100 TIMES

AFTER LEARNING 10,000 TIMES

AFTER LEARNING 60,000 TIMES

AFTER LEARNING 100 DATA
PATTERNS

AFTER LEARNING 10,000 DATA
PATTERNS

AFTER LEARNING 60,000 DATA
PATTERNS

SPIKING NEURAL NETWORK DEVICE THAT UPDATES SYNAPTIC WEIGHT BASED ON OUTPUT FREQUENCY AND LEARNING METHOD OF SPIKING NEURAL NETWORK DEVICE

CROSS-REFERENCE TO RELATED APPLICATIONS

This application is based upon and claims the benefit of priority from Japanese Patent Application No. 2020-035917, filed on Mar. 3, 2020; the entire contents of which are incorporated herein by reference.

FIELD

Embodiments described herein relate generally to a spiking neural network device and a learning method of the spiking neural network device.

BACKGROUND

There has been proposed a technology called a spiking neural network for performing processing that mimics the information processing principles of a biological neural network. In the spiking neural network, information is represented by the density of a spike voltage (spike density).

Further, in the spiking neural network, learning using the principles called spike timing dependent plasticity (STDP) is sometimes performed. In STDP, a synaptic weight changes depending on the input of a spike voltage and the timing of firing.

In the spiking neural networks, as described above, information is represented by spike density and thus information indicating "nothing" is represented as no spike density (no spikes). When a spiking neural network learns based on the STDP rules, the spiking neural network updates the synaptic weights depending on the input timing of spike voltages and the firing timing, and thus fails to learn blank data indicating "nothing", or information having a low spike density.

BRIEF DESCRIPTION OF THE DRAWINGS

FIG. 9 is a flowchart depicting learning processing of the first embodiment;

DETAILED DESCRIPTION

Figure 1:
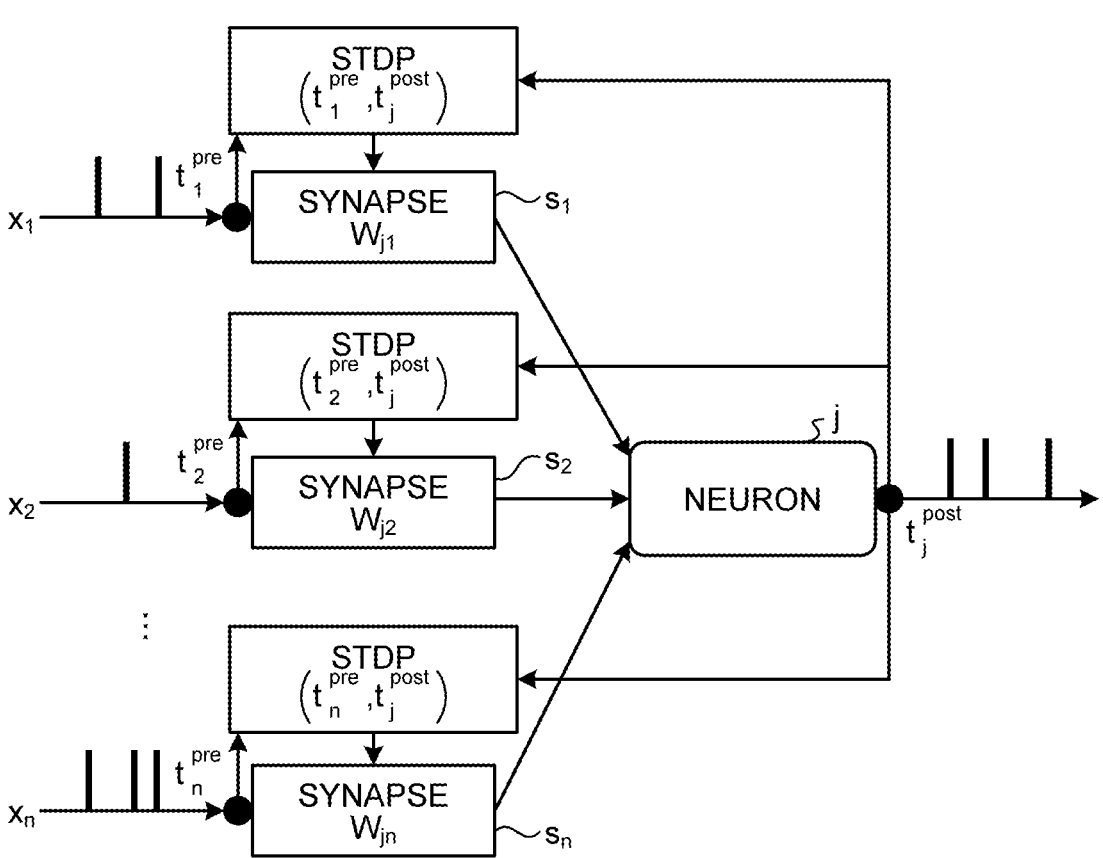
FIG. 1 is a schematic diagram illustrating STDP rules.

According to one embodiment, a spiking neural network device according to an embodiment includes a synaptic element, a neuron circuit, a determinator, a synaptic depressor, and a synaptic potentiator. The synaptic element has a variable weight and outputs, in response to input of a first spike signal, a synaptic signal having intensity adjusted in accordance with the weight. The neuron circuit outputs a second spike signal in a case where the synaptic signal is inputted and a predetermined firing condition for the synaptic signal is satisfied. The determinator determines whether or not the weight is to be updated on a basis of an output frequency of the second spike signal by the neuron circuit. The synaptic depressor performs depression operation for depressing the weight in a case where it is determined that the weight is to be updated. The synaptic potentiator performs potentiating operation for potentiating the weight.

Preferred embodiments of a spiking neural network device according to the present invention are detailed below with reference to the accompanying drawings.

Artificial intelligence technologies are developing rapidly with the progress in computing hardware such as graphical processing units (GPUs). Examples of the artificial intelligence include convolutional neural networks (CNNs), which are one of the main technologies for image recognition and image classification, and such technologies have found more and more real-life applications. Currently widely available artificial intelligence technologies are based on simplified mathematical models inspired by the operations of biological neural networks, and are suitably implemented by computing devices such as GPUs. However, implementing the artificial intelligence by GPUs is highly energy intensive. In particular, the learning process including extracting features from a large amount of data and storing them requires huge computational operations and thus requires a large amount of electric energy, which will be a constraint on learning at the edge.

Human brains, on the other hand, consume less energy of about 20 W, but can learn a large amount of data constantly online. Scientists and researchers around the world have been studying information processing technologies of reproducing the brain operations relatively faithfully using electric circuits.

In the neural networks of the brains, information is transmitted from neurons to neurons in the form of spike voltage signals. Neurons are interconnected by, what is called, synapses. When a neuron fires and generates a spike voltage, the spike voltage is input to downstream neurons via synapses. The magnitude of the spike voltage input to the downstream neurons is adjusted by the interconnecting strength (hereinafter referred to as "weight") of the synapses. A synapse having a large synaptic weight transmits the spike voltage to a postsynaptic neuron without reducing the magnitude of voltage, whereas a synapse having a small synaptic weight weakens the magnitude of the spike voltage to be transmitted. In this regard, a larger synaptic weight between neurons indicates that these neurons have a strong relation in terms of information transmitted therebetween.

It is known that the synaptic weight varies depending on the input timing of the spike voltage to the postsynaptic neuron and the firing timing of the postsynaptic neuron. When a spike voltage is input from a neuron (presynaptic neuron) to a subsequent neuron (postsynaptic neuron) via an interconnecting synapse, and then the postsynaptic neuron fires, the information of the presynaptic neuron and the information of the postsynaptic neuron have a causal relationship, and the synaptic weight between these two neurons increases. Alternatively, if the postsynaptic neuron fires before receiving the spike voltage from the presynaptic neuron, the information of the presynaptic neuron and the information of the postsynaptic neuron have no causal relationship, and the synaptic weight between these two neurons decreases. This feature involving a change in synaptic weight depending on the input timing of the spike voltage and the firing timing is called spike timing-dependent plasticity (STDP).

An information processing technique mimicking the information processing rules of such neural networks and representing a flow of information in an electric circuit by using spike trains is called a spiking neural network. In the spiking neural network, no numerical calculations are performed but all the information processing procedures are performed by storage, generation, and transmission of spike voltages. Training a conventional artificial intelligence requires a huge number of computational processes. However, the spiking neural network is considered to be able to be trained efficiently by using the STDP rules, and many studies on spiking neural networks have been made.

As described above, the key feature of STDP is that the synaptic weight varies depending on the input timing of a spike voltage from a presynaptic neuron to a postsynaptic neuron via an interconnecting synapse and the firing timing of the postsynaptic neuron. This STDP architecture is based on an input of a spike voltage from the presynaptic neuron. In other words, if input information is extremely small, no spike voltage is input from the presynaptic neuron, and the synaptic weight is not changed. This may cause the following problems.

Suppose that, for example, a spiking neural network learns input image patterns of 10×10 pixels. First, an image pattern (image A) widely spread in a 10×10 pixel grid is input repeatedly. The spiking neural network learns the input data based on the STDP learning rules and updates the synaptic weight accordingly, thereby obtaining a synaptic weight distribution corresponding to the image pattern. Then, another image pattern (image B) concentrating in the center of the 10×10 pixel grid is input. That is, most of the pixels of the image B are blank pixels. In spiking neural networks, information is represented by the density (spike density) of spike voltages, and thus blank pixels are represented as zero spike density. Accordingly, most of the synapses in this neural network receive no spike voltage and their weights are unchanged. In other words, the spiking neural network is not capable of learning this new image B due to the remaining synaptic weight distribution corresponding to the image A, regardless of how many times the neural network learns the image B. In this regard, when an STDP trained network receives information having a low spike density, it fails to learn this information and keeps previously learned information.

To prevent this problem, a conventional technology discloses a method of preparing two sets of spiking neural networks, one of which is trained by inputting original data and the other one of which is trained by inputting black-white inverted data. This method requires two sets of spiking neural networks, requiring twice the number of neurons and synapses. This configuration may double the size of the hardware, and double the energy required.

In biological neural networks, the sum of the weights of synapses input to one neuron is constant. This phenomenon is called synaptic normalization. In synaptic normalization, there is no change in the relative magnitude between the synaptic weights, and if one synaptic weight increases after learning, the other synaptic weights decrease to keep the sum constant. This configuration reduces the weight of synapses receiving a low spike voltage. Biological nervous systems use this scheme to learn blank data having a low spike density. However, implementing the synaptic normalization in hardware can be difficult because the synaptic normalization scheme requires adding synaptic weights for each neuron and dividing each synaptic weight by the sum.

Explanation on STDP First, STDP learning rules for a spiking neural network are described. FIG. 1 is a schematic diagram illustrating the STDP rules. As illustrated in FIG. 1, a plurality of synapses $s_1$, $s_2$, . . . , $s_n$ (which may be hereinafter collectively referred to as synapses $s_i$) are connected to a neuron j. Consider a case in which spike voltages $x_1$, $x_2$, . . . , $x_n$ are input to the neuron j through the synapses $s_1$, $s_2$, . . . , $s_n$, respectively. Let the weights $w_{ji}$ of the synapses $s_1$, $s_2$, . . . , $s_n$ be $w_{j1}$, $w_{j2}$, . . . , $w_{jn}$, respectively.

The state of the neuron j is represented by an internal variable called membrane potential. If no spike voltage is input, the membrane potential varies in accordance with a set rule called a neuron model. An input of a spike voltage to the neuron j increases the membrane potential discontinuously. After several spike voltages are input to the neuron j and the membrane potential reaches a threshold, the neuron j fires and releases a spike voltage to downstream neurons. After firing, the membrane potential of the neuron j is reset to a certain value, which is called a reset potential.

Suppose that a spike voltage is input to the neuron j via the synapse $s_1$ having the weight $w_{ji}$ at time $t_1^{pre}$, and the neuron j fires at time $t_j^{post}$, where $\Delta t_{ji}=t_j^{post}-t_i^{pre}$. If $\Delta t_{ji}>0$, that is, if the neuron j fires after receiving the spike voltage through the synapse $s_1$, the input of the spike voltage and the firing of the neuron j have a causal relation. Thus, connection of the synapse $s_1$ is considered to be effective in processing information and the weight $w_{ji}$ of the synapse $s_1$ is potentiated (increased). Conversely, if $\Delta t_{ji}<0$, that is, if the neuron j fires before the spike voltage reaches the neuron j via the synapse $s_1$, the input of the spike voltage and the firing of the neuron j have no causal relation. Thus, connection of the synapse $s_1$ is considered to be not effective in processing information and the weight $w_{j1}$ of the synapse $s_1$ is depressed (decreased).

Figure 2:
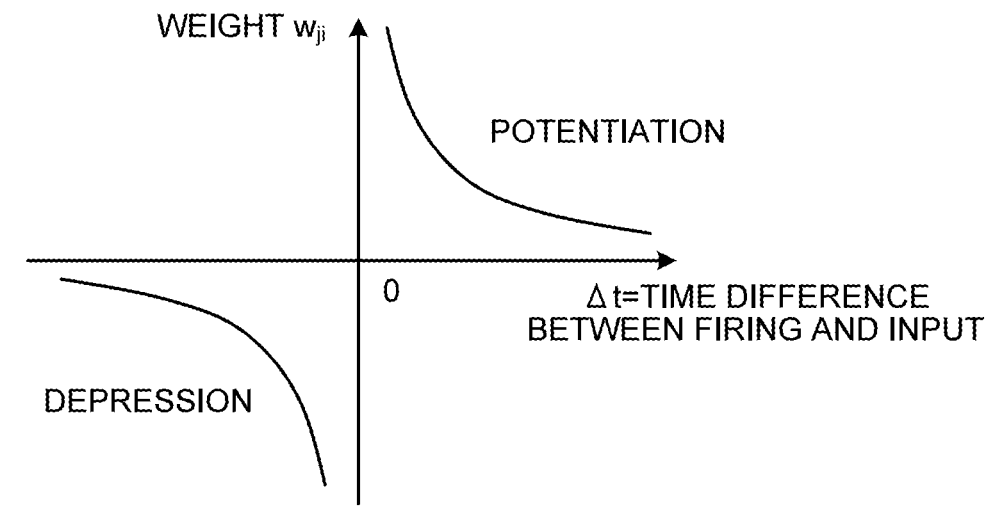
FIG. 2 is a graph illustrating an example of potentiation and depression of synaptic weight.

In the STDP trained network, the extent to which the weight $w_{ji}$ of the synapse $s_i$ is potentiated or depressed is determined in accordance with the time difference $\Delta t$ between the time at which the neuron j fires and the time at which the spike voltage is input via the synapse $s_i$. In other words, as illustrated in FIG. 2, if $\Delta t>0$, a time difference $\Delta t$ having a smaller absolute value means a greater informational correlation between the firing of the neuron j and the input of a spike voltage, and thus, the weight $w_{ji}$ of the synapse $s_i$ is significantly potentiated. If $\Delta t<0$, a time difference $\Delta t$ having a smaller absolute value means a smaller informational correlation between the firing of the neuron j and the input of the spike voltage, and thus, the weight $w_{ji}$ of the synapse $s_i$ is significantly depressed. In both cases of $\Delta t>0$ and $\Delta t<0$, the weight $w_{ji}$ hardly varies when $\Delta t$ has a large absolute value.

Figure 3:
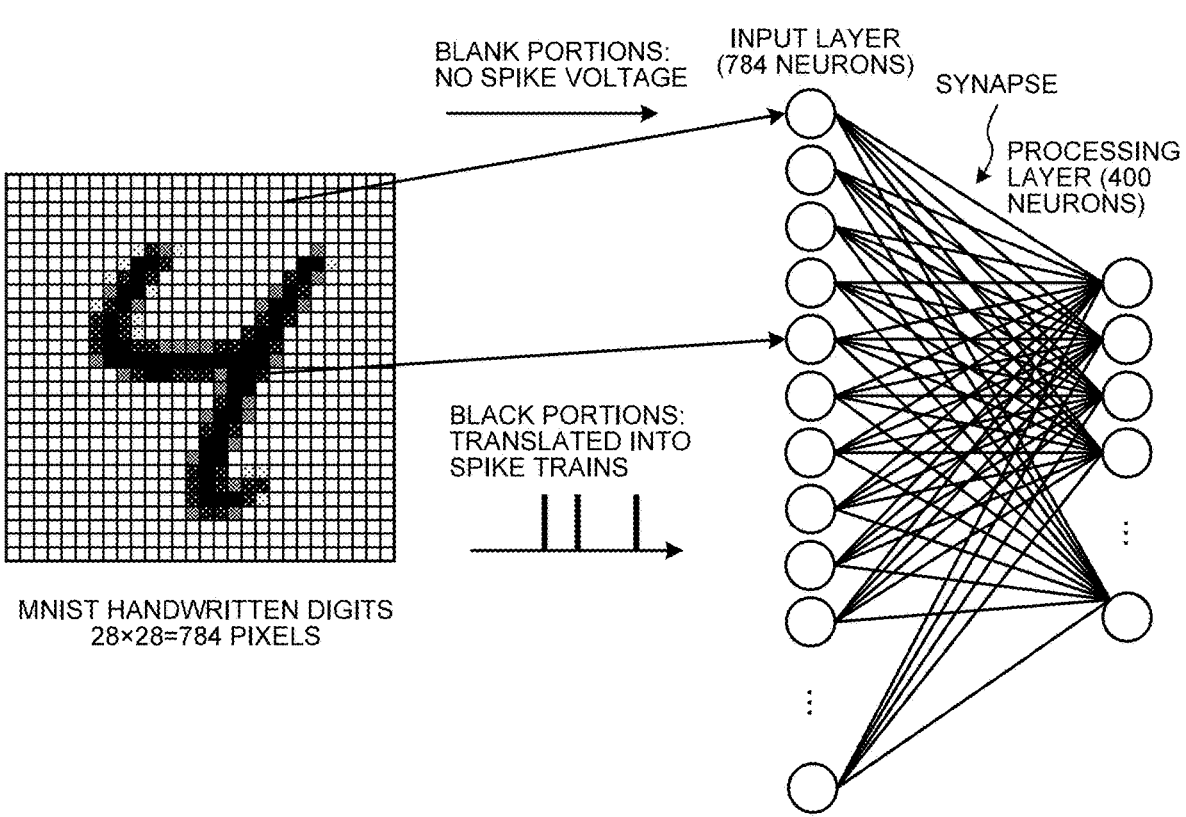
FIG. 3 is a diagram illustrating a specific example of how a spiking neural network learns.

Consider a case in which the spiking neural network is trained using image data of 28×28=784 pixels as illustrated in FIG. 3. In this case, contrasts of the pixels are input to 784 neurons in an input layer. The neurons in the input layer generate spike trains having spike densities corresponding to the contrasts and transmit spike voltages to downstream 400 neurons in a subsequent processing layer. The neurons in the input layer and the neurons in the processing layer are connected via synapses.

As described above, the neurons in the input layer generate spike trains corresponding to respective contrasts of the pixels. For a high-contrast pixel (black pixel), a spike train having a high spike density is generated. For a low-contrast pixel (white pixel), a spike train having a low spike density is generated. Neurons corresponding to blank portions of the input image generate no spike voltage. Accordingly, synapses connecting to the neurons corresponding to the blank portions of the input image transmit no spike voltage to the neurons in the processing layer. The weights of the synapses connecting to the neurons corresponding to the blank portions of the input image are neither potentiated nor depressed but are still in the initial state. In other words, the spiking neural network fails to learn information indicating "blankness".

Consider a case in which the spiking neural network illustrated in FIG. 3 learns the MNIST handwritten digit dataset (a set of handwritten digits from 0 to 9). In this learning, a probabilistic STDP approach is taken. In this approach, the synaptic weight is set to a discrete binary value (0 or 1), and if a neuron fires after receiving an input of a spike voltage via a synapse, the weight of the synapse is probabilistically set to 1, whereas if the neuron fires before receiving an input of a spike voltage via a synapse, the weight of the synapse is probabilistically set to 0. To incorporate a temporal correlation between an input of a spike voltage and the firing of a neuron into this approach, the probability is set depending on the time difference between the firing of the neuron and the input of the spike voltage via a synapse. Specifically, let the time difference be $\Delta t$, the probability of setting the synaptic weight to 0 (or 1) is proportional to $\exp(-\Delta t/T)$, where T is a constant.

Figure 4A:
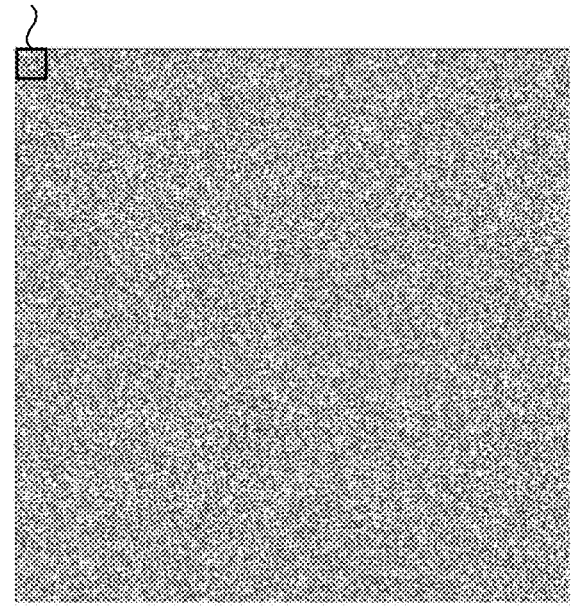
FIG. 4A is a diagram illustrating visualized weights of all the synapses illustrated in FIG. 3.
Figure 4B:
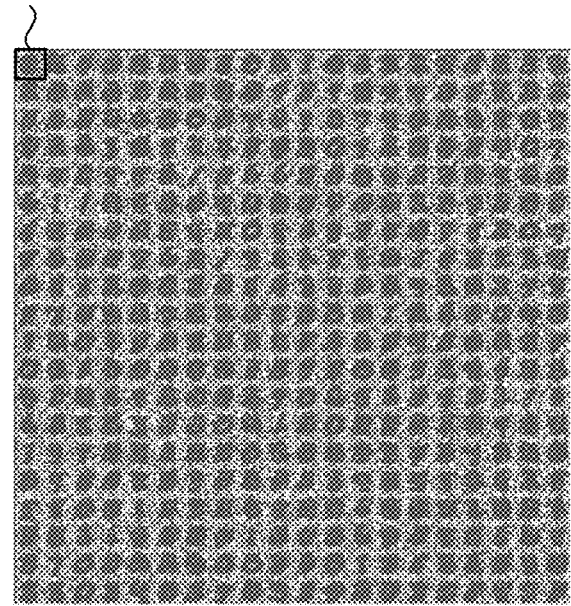
FIG. 4B is a diagram illustrating visualized weights of all the synapses illustrated in FIG. 3.
Figure 4C:
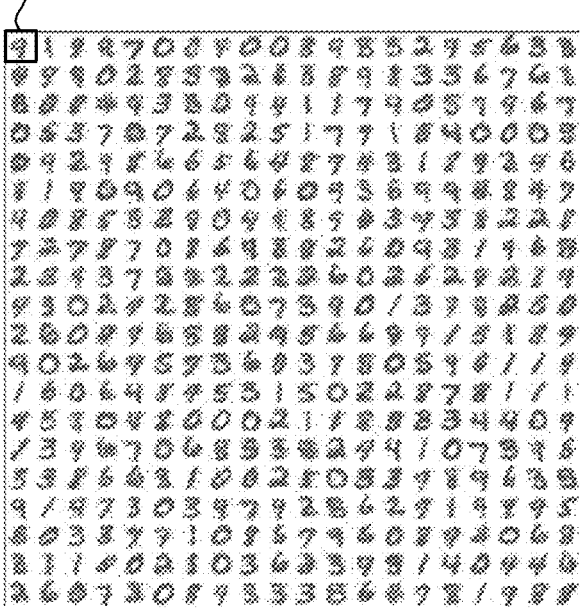
FIG. 4C is a diagram illustrating visualized weights of all the synapses illustrated in FIG. 3.

FIGS. 4A to 4C are diagrams illustrating visualized weights of all the synapses (784×400 synapses) connecting 784 neurons in the input layer with 400 neurons in the processing layer as illustrated in FIG. 3. In respective vertical and horizontal directions, √784×400=28×20=560 pixels are arranged and each pixel represents a corresponding synaptic weight. White pixels represent a synaptic weight of 0, whereas colored pixels represent a synaptic weight of 1. The weights of 560×560 synapses are grouped into 20×20 sections each including 28×28 pixels. Each section including 28×28 pixels corresponds to the entire synapses connecting to one neuron in the processing layer, and has a pattern representing the weight distribution of 28×28 synapses. This pattern is an image stored in the neuron in the processing layer.

As illustrated in FIG. 4A, first, all the individual synaptic weights are randomly set to an initial value of 0 or 1. The spiking neural network illustrated in FIG. 3 is trained using the MNIST handwritten digit dataset in this state. FIG. 4B illustrates synaptic weights after learning 60,000 patterns of handwritten digits. There are 20×20=400 patterns emerging in FIG. 4B. Each pattern includes 28×28 pixels. In other words, a pattern emerges in each section including 28×28 pixels and this pattern is an image stored in the neuron corresponding to this section.

Pixels corresponding to blank portions of the MNIST handwritten digits remain in the initial state because no spike voltage is input, and thus still have random patterns. At a center portion of each section, there is a seemingly overlapping pattern of many handwritten digits. When, for example, a neuron learns a handwritten digit of "0" and then learns "1", the blank portion of the handwritten digit "1" receives no spike voltage and thus the handwritten digit "0" remains in the blank portion. The neuron stores both "0" and "1" in an overlapping manner. Such operations are repeated and the neurons store patterns of overlapping handwritten digits.

When a recognition operation on the MNIST handwritten digits is performed by using the synaptic weight illustrated in FIG. 4B, the recognition rate is only about 10%. This result substantially equates to a random guess of the handwritten digits from 0 to 9. In other words, the spiking neural network fails to recognize the handwritten digits at all.

The essence of the problem is that neurons receive no spike voltage corresponding to blank data (i.e., blank portions of an image), and the weight of the synapses corresponding to these neurons are unchanged, whereby the synaptic weights are kept in the initial state or left un-updated with the previously stored information. Ideally, synaptic weights corresponding to blank data have to be depressed. As described above, the neural networks can learn blank data by implementing the synaptic normalization of the biological nervous systems.

FIG. 4C illustrates the learning results of a spiking neural network that learns based on the STDP rules and by implementing synaptic normalization in software. It is apparent from FIG. 4C that the synaptic normalization is successful in training the sections each including 28×28 pixels to learn the MNIST handwritten digits. In this example, the recognition rate on the handwritten digits reaches 89%. However, synaptic normalization requires the procedure of adding all the synaptic weights of each section including 28×28 pixels, dividing each synaptic weight by the sum, and rewriting the resulting values in the synapses. This procedure is not suited to hardware implementation.

In view of this, in the present embodiment, there is disclosed a spiking neural network device that a new configuration including a mechanism for depressing the synaptic weights on the basis of a firing state (firing frequency) of neurons instead of using a sum of the synaptic weights, and a learning method of the spiking neural network device.

First Embodiment

Figure 5:
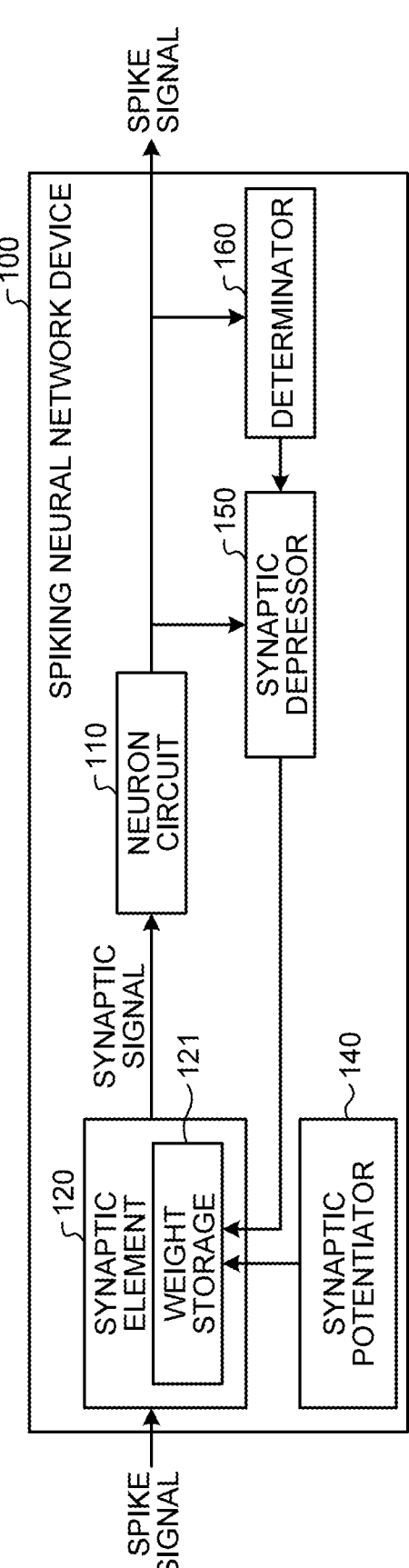
FIG. 5 is a diagram illustrating an example of the configuration of a spiking neural network device according to a first embodiment.

FIG. 5 is a diagram illustrating an example of the configuration of a spiking neural network device 100 according to the first embodiment. As illustrated in FIG. 5, the spiking neural network device 100 of the present embodiment includes a synaptic element 120, a neuron circuit 110, a synaptic potentiator 140, a synaptic depressor 150, and a determinator 160.

The synaptic element 120 has weight storage 121 for storing a variable weight. The synaptic element 120 receives a spike signal (first spike signal). When receiving the spike signal, the synaptic element 120 transfers, to the neuron circuit 110, a synaptic signal whose intensity is adjusted according to the weight held by the weight storage 121. For example, the intensity of the synaptic signal outputted to the neuron circuit 110 increases when the weight stored in the weight storage 121 is large and decreases when the weight is small.

The neuron circuit 110 receives the synaptic signal outputted from the synaptic element 120, and when a predetermined firing condition is satisfied, the neuron circuit 110 fires and outputs a spike signal (second spike signal). For example, the neuron circuit 110 integrates the inputted synaptic signal and fires when the integrated value exceeds a predetermined threshold, and emits a spike signal (spike voltage) toward a downstream neuron circuit.

The determinator 160 determines a condition indicating whether or not the weight of the synaptic element 120 is updated. For example, the determinator 160 determines whether or not the weight is updated on the basis of an output frequency of the spike signal by the neuron circuit 110 (hereinafter, referred to as a firing frequency), and when determining that the weight is to be updated, the determinator 160 outputs a signal indicating that the weight is to be updated to the synaptic depressor 150. More specifically, the determinator 160 determines that the weight is to be updated when the firing frequency is equal to or greater than the threshold. Hereinafter, updating the weight of the synaptic element 120 is sometimes referred to as synapse update.

The synaptic depressor 150 performs depression operation for depressing the weight in a case where the determinator 160 determines that the synapse update is possible, and where a predetermined depression condition is satisfied. The weight storage 121 depresses the weight in accordance with the depression operation of the synaptic depressor 150.

The synaptic potentiator 140 performs potentiating operation for potentiating the weight of the synaptic element 120 in a case where a predetermined potentiating condition is satisfied. For example, the synaptic potentiator 140 performs the potentiating operation in accordance with the potentiating condition for weight on the basis of the principles of STDP described with reference to FIG. 1.

Figure 6:
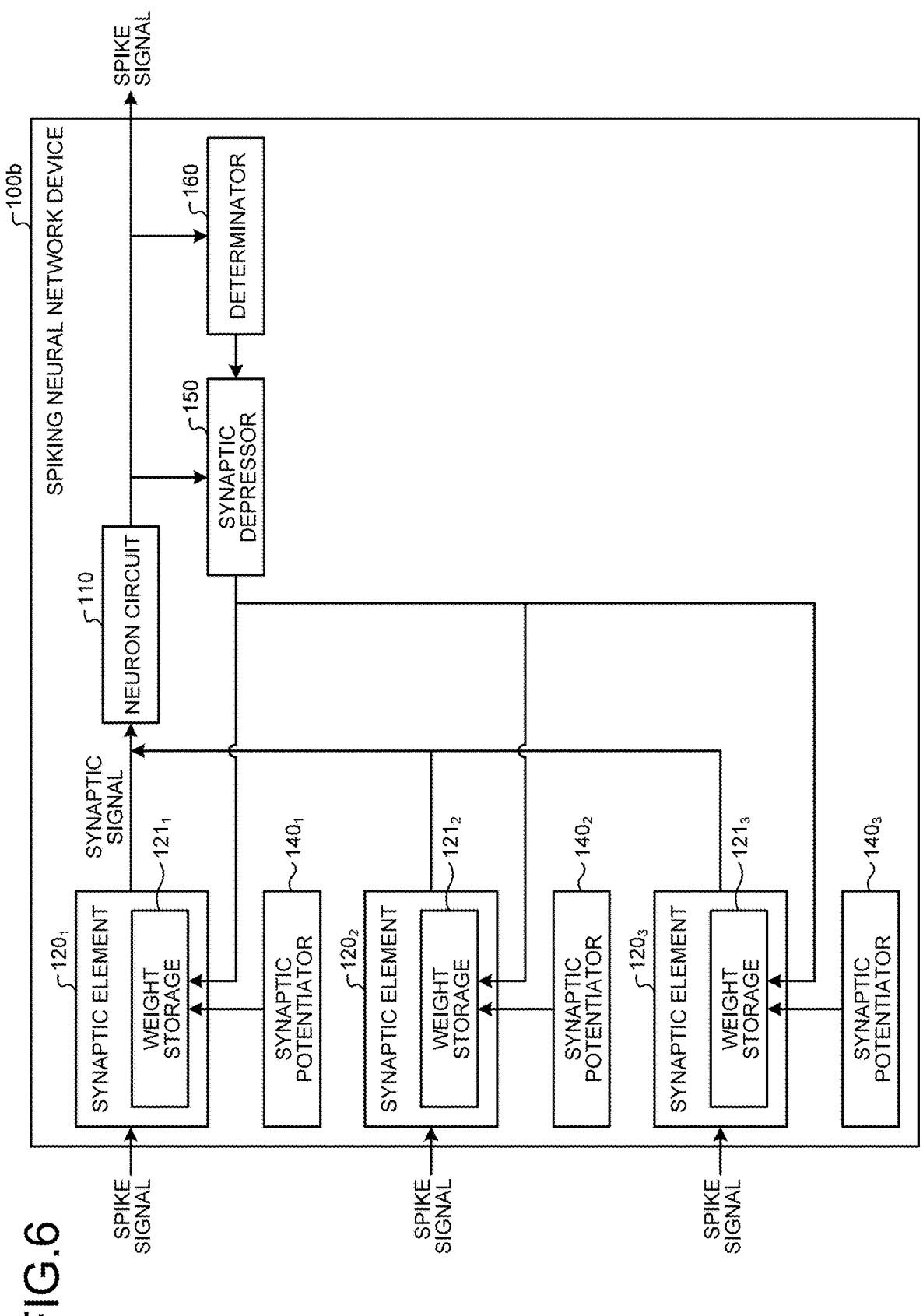
FIG. 6 is a diagram illustrating another example of the configuration of a spiking neural network device.

In FIG. 5, one synaptic element 120 is connected to one neuron circuit 110; however, a plurality of synaptic elements may be connected to one neuron circuit 110. FIG. 6 is a diagram illustrating an example of the configuration of a spiking neural network device 100b as configured described above. Although FIG. 6 illustrates an example of the configuration in which three synaptic elements are connected to the neuron circuit 110, the spiking neural network device 100b may be so configured that two synaptic elements or four or more synaptic elements are connected to the neuron circuit 110.

As illustrated in FIG. 6, the spiking neural network device 100b includes synaptic elements 1201 to 1203, the neuron circuit 110, synaptic potentiators 1401 to 1403, the synaptic depressor 150, and the determinator 160.

The synaptic potentiators 1401 to 1403 correspond to the synaptic elements 1201 to 1203 respectively, and potentiate the weights of weight storages 1211 to 1213 of the corresponding synaptic elements 1201 to 1203. A certain synaptic potentiator may have a part or the whole of the function of the synaptic potentiators 1401 to 1403.

Figure 7:
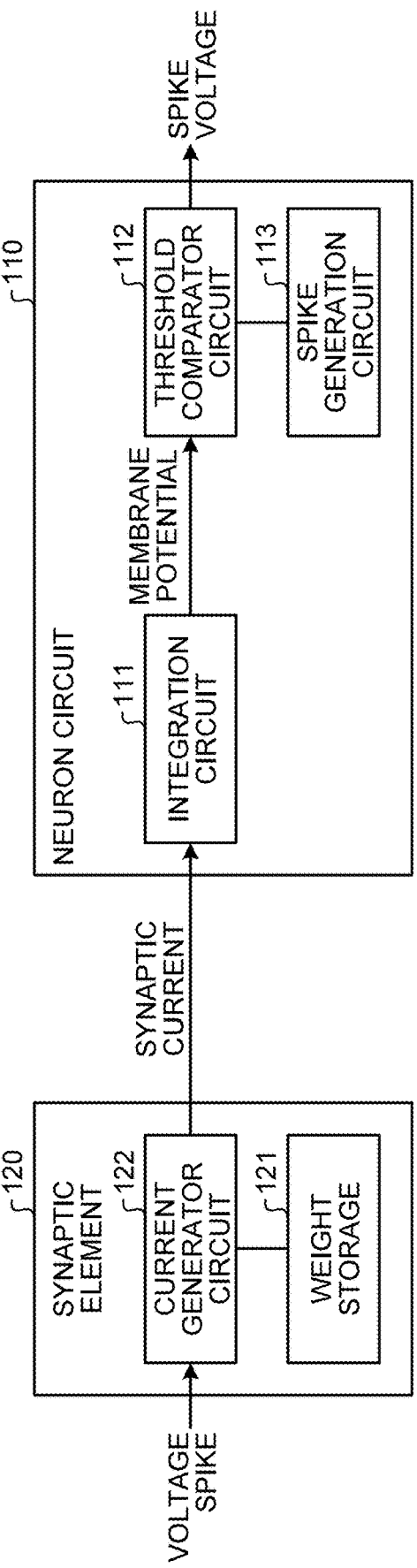
FIG. 7 is a functional block diagram of a synaptic element and a neuron circuit.

Next, the configuration of the synaptic element 120 and the neuron circuit 110 is detailed. FIG. 7 is a block diagram illustrating an example of the detailed functional configuration of the synaptic element 120 and the neuron circuit 110.

As illustrated in FIG. 7, the synaptic element 120 includes a current generator circuit 122 in addition to the weight storage 121. The neuron circuit 110 includes an integration circuit 111, a threshold comparator circuit 112, and a spike generation circuit 113.

A spike signal inputted to the synaptic element 120 is a spike voltage, for example. The spike voltage is inputted to the current generator circuit 122. Depending on the input of the spike voltage, the current generator circuit 122 generates a current depending on the value of the weight stored in the weight storage 121. The current is called a synaptic current.

The weight storage 121 is, for example, a memory circuit including a memory element. The memory element may be a volatile memory element or a non-volatile memory element. Examples of the volatile memory element include a static random-access memory (SRAM) cell and a dynamic random-access memory (DRAM) cell (capacitor). Examples of the non-volatile memory element include a transistor (flash memory cell) having a floating gate or a charge storage film, a magnetic tunnel junction element (magnetic tunnel junction (MTJ) or magnetoresistive random-access memory (MRAM) cell), and a resistance change type memory element (memristor).

The weight value may be stored as digital data in the memory circuit and may be stored as analog data. The current generator circuit 122 generates a larger synaptic current as the weight increases with respect to the inputted spike voltage. The synaptic current corresponds to a synaptic signal and is inputted to the neuron circuit 110.

The integration circuit 111 integrates the inputted synaptic current to convert the same to a voltage called a membrane potential. The temporal change in the membrane potential is determined by a neuron model set in advance in the integration circuit 111. Any model can be used as the neuron model, and for example, a leaky integrate and fire (LIF) model may be used as the neuron model.

The threshold comparator circuit 112 compares the membrane potential outputted from the integration circuit 111 with the predetermined threshold. The spike generation circuit 113 generates and outputs a spike voltage when the membrane potential exceeds the threshold. The generation of such a spike voltage in the neuron circuit 110 is referred to as firing.

Further descriptions are given of updating the weight of the synaptic element 120 (synaptic weight).

Potentiating the weight is performed by increasing the weight value stored in the weight storage 121 in a case where the predetermined potentiating condition for potentiating the synapse is satisfied. The potentiating condition is, for example, a condition for potentiating the synaptic weight of STDP.

On the other hand, depressing the weight is performed by decreasing the weight value stored in the weight storage 121 in a case where the predetermined depression condition for depressing the synapse is satisfied and the determinator 160 outputs a signal indicating that synapse update is possible.

The determinator 160 monitors the firing situation of the neuron circuit 110, determines whether or not to update the synapse according to the firing situation of the neuron circuit 110, and gives permission for depression operation to the synaptic depressor 150. For example, the determinator 160 enables the depression operation in a case where the firing frequency of the neuron circuit 110 is equal to or greater than the predetermined threshold.

The fact that the firing frequency of the neuron circuit 110 is equal to or greater than the threshold means that the sum of the synaptic currents inputted to the neuron circuit 110 is equal to or greater than a certain value. This means that the weight (when a plurality of synaptic elements 120 is connected, the sum of the weights of the synaptic elements 120) held by the synaptic element 120 that gives an input to the neuron circuit 110 is sufficiently large.

In the present embodiment, the sum of the weights of the synaptic element 120 can be reduced to the threshold by giving permission for the depression operation under the condition that the firing frequency is equal to or greater than the threshold. In a case where the firing frequency is small, no depression operation is performed and only potentiating operation in accordance with the potentiating condition is performed. Therefore, the sum of the weights increases and eventually reaches the threshold. In this way, it is possible to achieve the synaptic normalization with the sum of weights constant on average.

The above processing can be defined as the following mathematical formula. Each of "i" and "j" is information for identifying the synaptic element 120 and the neuron circuit 110. To be specific, suppose that the synaptic element 120 identified by "i" (hereinafter, referred to as a synaptic element 120*i*) inputs a spike signal to the neuron circuit 110 identified by "j" (hereinafter, referred to as a neuron circuit 110*j*).

Let $w_{ij}$ denote the weight stored in the synaptic element 120*i*. Let $F_j$ denote the firing frequency of the neuron circuit 110*j*. Let $F_T$ denote the threshold of the firing frequency. Let $\pi_{ij}{}^p$ denote the potentiating condition defined for the synaptic element 120*i*. Let mid denote the depression condition defined for the neuron circuit 110*j*. In such a case, update of the weight $w_{ij}$ is defined by mathematical formula (1) as provided below. In the mathematical formula, $\Theta$ is a step function that is 1 if the argument is positive and is 0 (zero) if the argument is negative.

$$\Delta w_{ij} = \pi_{ij}^p - \pi_j^d \Theta(F_j - F_T) \tag{1}$$

For implementation of $\Theta(F_j-F_T)$ in the analog electrical circuit, the firing frequency $F_j$ should be represented as a physical quantity on the circuit. It is also necessary to consider the time width for defining the firing frequency, which may complicate the design. To address this, for example, the following circuit can be used as a circuit of which design can be simplified.

First, a new variable $C_j$ is considered which usually decreases by a time constant t and increases, by $J_c$, discontinuously when the neuron circuit 110*j* fires. To be specific, suppose that the variable $C_j$ conforms to mathematical formula (2) provided below. $t_j^{post}$ represents a time at which the neuron circuit 110*j* fires.

$$\frac{dC_j}{dt} = -\frac{C_j}{\tau} + J_C \delta\left(t - t_j^{post}\right) \tag{2}$$

Figure 8:
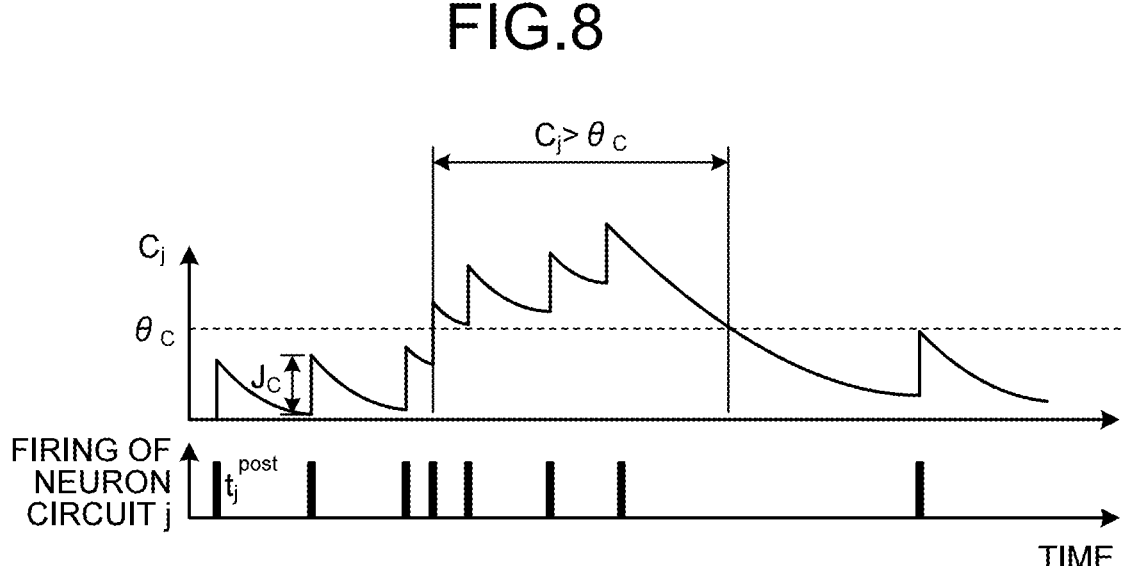
FIG. 8 is a diagram illustrating an example of the relationship between firing of a neuron circuit and a change in variable $C_j$.

FIG. 8 is a diagram illustrating an example of the relationship between firing of the neuron circuit 110*j* and a change in variable $C_j$. The variable $C_j$ decreases to approach 0 (zero) when the neuron circuit 110*j* does not fire. On the other hand, if firing occurs frequently, the amount of discontinuous increase due to $J_c$ is larger than the amount of decrease, and the variable $C_j$ increases. Accordingly, as illustrated in FIG. 8, in order for $C_j$ to be greater than a certain threshold $\theta_c$, the firing frequency should be equal to or greater than a certain threshold.

By using this, update of the weight $w_{ij}$ can be defined by mathematical formula (3) as provided below. In mathematical formula (3), $\Delta w_{ij}$ represents the update amount of weight $w_{ij}$.

$$\Delta w_{ij} = \pi_{ij}^p - \pi_j^d \Theta(C_j - \theta_C) \tag{3}$$

As described above, the firing frequency can be represented by a variable $C_j$ that increases each time the neuron circuit 110 outputs a spike signal and decreases with time. In order to achieve such a variable $C_j$, for example, an analog integration circuit including a capacitor may be used. Examples of such a circuit include a circuit described in Elisabeta Chicca, Fabio Stefanini, Chiara Bartolozzi, Giacomo Indiveri, "Neuromorphic Electronic Circuits for Building Autonomous Cognitive Systems," Proceedings of the IEEE, vol. 102, no.9, September 2014, 1367-1388.

The depression condition $\pi_j{}^d$ is a condition that the weight is depressed at timing of firing of the neuron circuit 110*j*. That is, the depression condition $\pi_j{}^d$ is defined by, for example, mathematical formula (4) as provided below. In mathematical formula (4), $\delta$ is a function (delta function) that is 1 if the argument is 0 (for example $t=t_j^{post}$) and is 0 in the other cases.

$$\pi_j^d \propto \delta\left(t - t_j^{post}\right) \tag{4}$$

The arrows from the neuron circuit 110 to the synaptic depressor 150 of FIGS. 5 and 6 represent a signal for transmitting the timing of firing of the neuron circuit 110*j* to the synaptic depressor 150.

The description goes on to learning processing by the spiking neural network device 100 configured as described above according to the first embodiment. FIG. 9 is a flowchart depicting an example of the learning processing of the first embodiment.

The determinator 160 receives a spike signal from the neuron circuit 110 (Step S101). The determinator 160 determines whether or not the weight of the synaptic element 120 is to be updated on the basis of the received spike signal (Step S102). For example, the determinator 160 determines that the weight is to be updated if the firing frequency of the spike signal by the neuron circuit 110 is equal to or greater than a threshold.

If determining that the weight is to be updated (Step S102: Yes), the determinator 160 outputs a signal indicating that weight update is possible (Step S103).

After the signal is outputted, and, if it is determined that the weight is not to be updated (Step S102: No), the synaptic depressor 150 determines whether or not the signal indicating that weight update is possible is outputted and the depression condition is satisfied (Step S104).

If the signal indicating that weight update is possible is outputted and the depression condition is satisfied (Step S104: Yes), the synaptic depressor 150 performs depression operation for depressing the weight of the synaptic element 120 (Step S105).

If the signal indicating that weight update is possible is not outputted, or, if the depression condition is not satisfied (Step S104: No), and, after the depression operation is performed, the synaptic potentiator 140 determines whether or not the potentiating condition is satisfied (Step S106).

If the potentiating condition is satisfied (Step S106: Yes), the synaptic potentiator 140 performs potentiating operation for potentiating the weight of the synaptic element 120 (Step S107).

After the potentiating operation is performed, and if the potentiating condition is not satisfied (Step S106: No), the learning processing is finished.

Figure 10A:
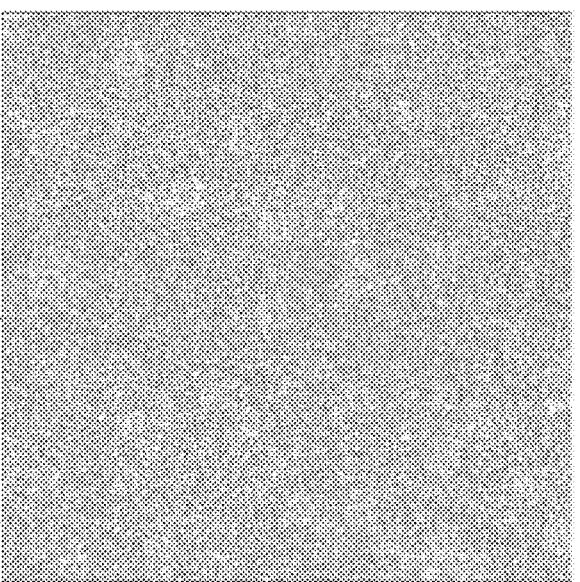
FIG. 10A is a diagram illustrating an example of a learning result of MNIST handwritten characters.
Figure 10B:
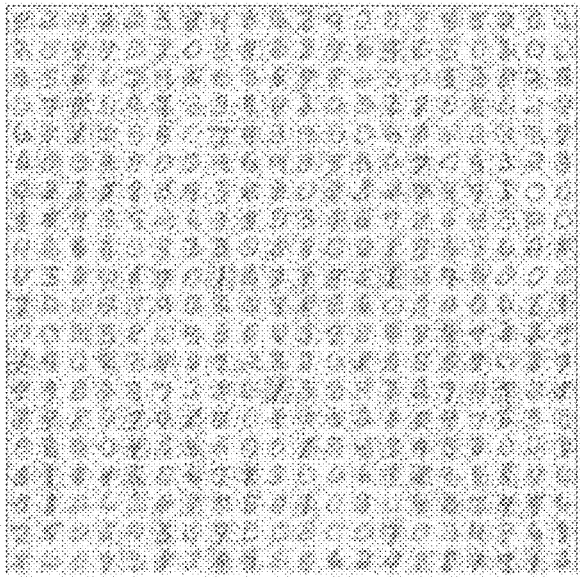
FIG. 10B is a diagram illustrating an example of a learning result of MNIST handwritten characters.
Figure 10C:
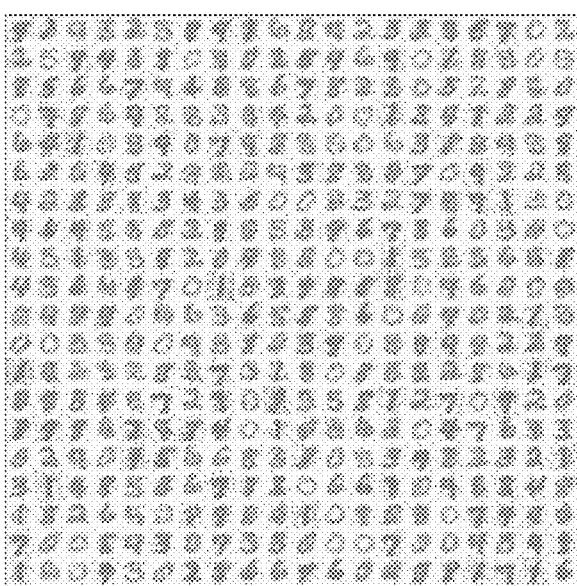
FIG. 10C is a diagram illustrating an example of a learning result of MNIST handwritten characters.

FIGS. 10A to 10C are diagrams illustrating examples of learning results of MNIST handwritten characters by the spiking neural network device 100 in the present embodiment. The neural network used herein is similar to that illustrated in FIG. 3. Here, the synaptic element 120 is a binary synapse with a weight value of only 0 or 1. Therefore, the weight update is processing of changing $w_{ij}$ from 0 to 1 or from 1 to 0 with a probability proportional to $\Delta w_{ij}$, instead of updating the weight by $\Delta w_{ij}$. The synaptic potentiator 140 uses the potentiating condition of STDP, and the synaptic depressor 150 uses the depression condition defined by mathematical formula (4) above. To be specific, $\Delta w_{ij}$ is defined by mathematical formula (5) as follows.

$$\Delta w_{ij} = \eta_{pot}\exp\left(-\frac{t_i^{pre} - t_j^{post}}{\tau_{STDP}}\right)\delta(t - t_i^{pre}) - \eta_{dep}\Theta(C_j - \theta_C)\delta(t - t_j^{post}) \quad (5)$$

In mathematical formula (5), $\eta_{pot}$, $\eta_{dep}$, and $\tau_{STDP}$ are constants, and $t_i^{pre}$ is a time at which a spike signal is inputted to the synaptic element 120i. If $\Delta w_{ij}$ is a positive value, $\Delta w_{ij}$ represents a probability that, at time t, the weight value of the synaptic element 120i is potentiated from 0 to 1. If $\Delta w_{ij}$ is a negative value, $\Delta w_{ij}$ represents a probability that, at time t, the weight value of the synaptic element 120i is depressed from 1 to 0 (the value does not change if it is already 1 or 0).

As illustrated in FIGS. 10A to 10C, as the number of times of learning increases, the weight distribution that was random at the beginning gradually forms a pattern. After 60,000 times of learning (FIG. 10C), the character recognition rate in the neural network using the weight distribution becomes 77.3%. As illustrated in FIGS. 10A to 10C, the application of the present embodiment enables learning of a blank part of the character pattern. In other words, the present embodiment has effects comparable to the synaptic normalization in the second term of mathematical formula (5), and the synaptic weight corresponding to the blank part is depressed to zero.

It is noted that, as the synaptic element 120, a synapse of which a weight value can range from 0 to 1 can be used instead of the binary synapse. In this case, for example, the weight update is implemented by updating the weight by $\Delta w_{ij}$.

As described above, in the spiking neural network device according to the first embodiment, the synaptic weight is depressed on the basis of the firing state (firing frequency) of neurons. For example, since it is not necessary to calculate the sum of weights of the plurality of synaptic elements, the synaptic normalization can be achieved with a simpler configuration.

Second Embodiment

A spiking neural network device according to the second embodiment also performs the potentiating operation in a case where it is determined that the synapse update is possible.

Figure 11:
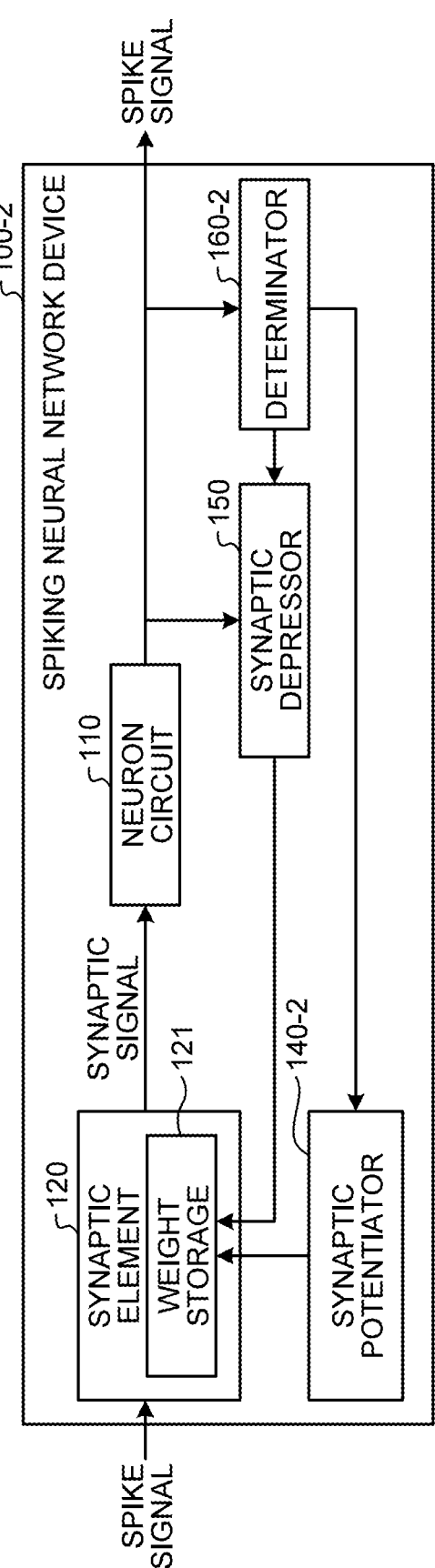
FIG. 11 is a diagram illustrating an example of the configuration of a spiking neural network device according to a second embodiment.

FIG. 11 is a diagram illustrating an example of the configuration of a spiking neural network device 100-2 according to the second embodiment. As illustrated in FIG. 11, the spiking neural network device 100-2 of the present embodiment includes the synaptic element 120, the neuron circuit 110, a synaptic potentiator 140-2, the synaptic depressor 150, and a determinator 160-2.

In the second embodiment, the functions of the synaptic potentiator 140-2 and the determinator 160-2 are different from those of the first embodiment. The other configurations and functions are similar to those of FIG. 1 that is the block diagram of the spiking neural network device 100 according to the first embodiment; therefore, the same reference numerals are used thereto, and a description thereof is omitted.

The determinator 160-2 is different from the determinator 160 of the first embodiment in that the determinator 160-2 outputs a signal regarding whether or not the synapse update is allowed not only to the synaptic depressor 150 but also to the synaptic potentiator 140-2.

The synaptic potentiator 140-2 receives a signal indicating that synapse update is possible from the determinator 160-2, and performs potentiating operation for potentiating the weight of the synaptic element 120 in a case where a predetermined potentiating condition is satisfied.

Figure 12:
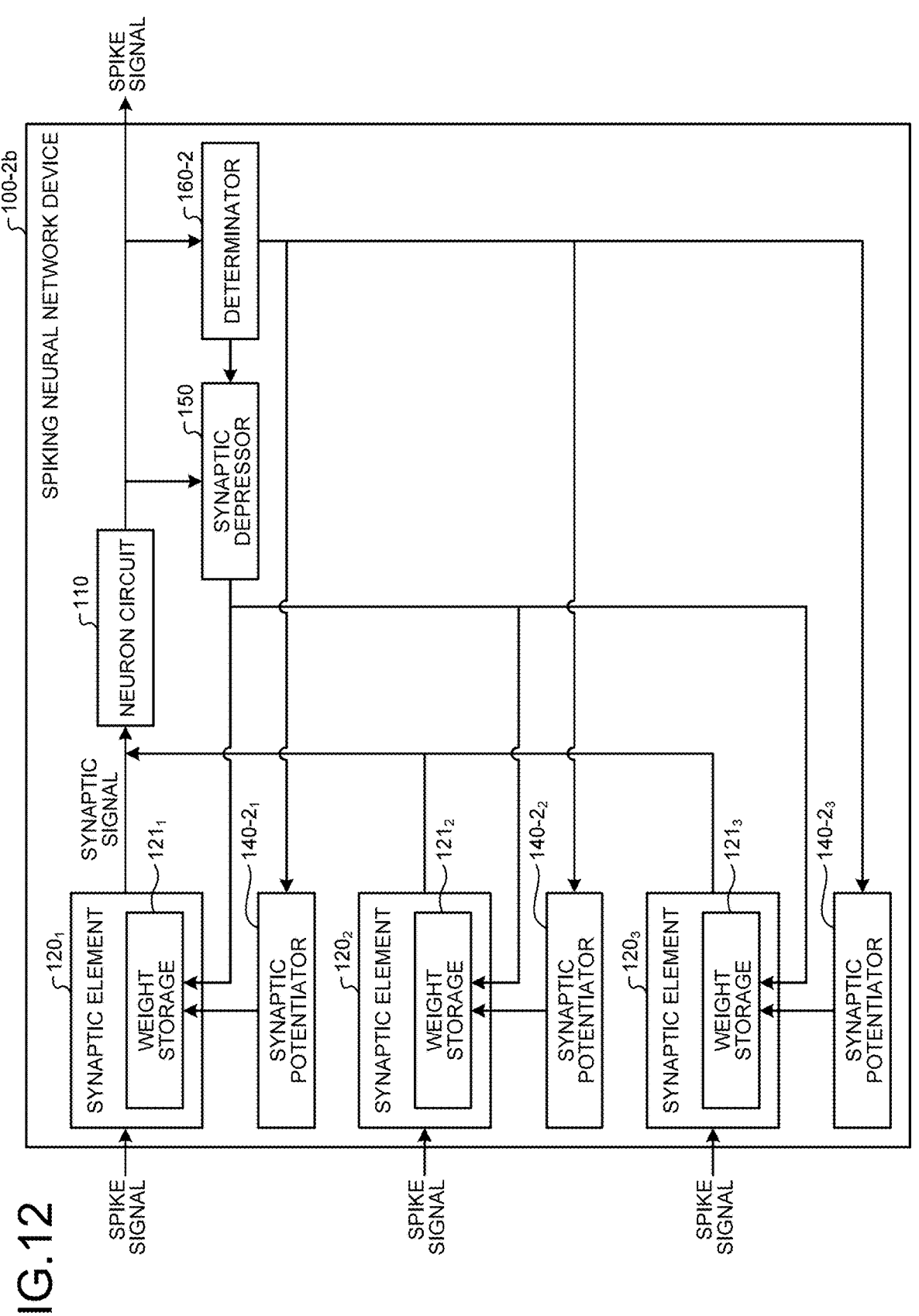
FIG. 12 is a diagram illustrating another example of the configuration of a spiking neural network device.

As with FIG. 6 of the first embodiment, a plurality of synaptic elements may be connected to one neuron circuit 110. FIG. 12 is a diagram illustrating an example of the configuration of a spiking neural network device 100-2b configured as described above. As illustrated in FIG. 12, the spiking neural network device 100-2b includes the synaptic elements 1201 to 1203, the neuron circuit 110, synaptic potentiators 140-21 to 140-23, the synaptic depressor 150, and a determinator 160-2.

As described above, for learning in the neural network, it is desirable to implement the synaptic normalization in which the sum of weights is kept constant. For implementation of the synaptic normalization, it is desirable to keep a balance between the potentiating operation and the depression operation. In other words, it is desirable to avoid a situation in which only the potentiating operation is permitted and the depression operation is not permitted, or conversely, a situation in which only the depression operation is permitted and the potentiating operation is not permitted. When such a situation occurs, only potentiating operation probably occurs or only depression operation probably occurs under certain conditions, which may make the synaptic normalization impossible. In view of this, the potentiating operation should be permitted under conditions similar to those of the depression operation, for example, if the firing frequency is equal to or greater than a threshold $(F_j > F_T)$. In other words, the weight update is desirably defined by mathematical formula (6) provided below. In mathematical formula (6), $\pi_i^P$ represents the potentiating condition in the synaptic element 120$i$.

$$\Delta w_{ij} = \pi_i^P \Theta(F_j - F_T) - \pi_j^d \Theta(F_j - F_T) = \left(\pi_i^P - \pi_j^d\right)\Theta(F_j - F_T) \quad (6)$$

In a case where the variable $C_j$ is used as with the first embodiment, mathematical formula (6) can be defined by mathematical formula (7) below.

$$\Delta w_{ij} = \left(\pi_i^P - \pi_j^d\right)\Theta(C_j - \theta_C) \quad (7)$$

In the meantime, Hebb's rule has been known as a rule for potentiating the synaptic weight. According to Hebb's rule, an increment $\Delta w_{ij}$ of the weight $w_{ij}$ is proportional to the frequency $F_i$ of a spike signal in the synaptic element 120$i$ and the firing frequency $F_j$ of the neuron circuit 110$j$. Specifically, mathematical formula (8) below represents Hebb's rule.

$$\Delta w_{ij} = F_i F_j \quad (8)$$

As described above, the increment $\Delta w_{ij}$ is a linear function of $F_j$. On the other hand, in a case where $\Theta(F_j - F_T)$ is regarded as a function of $F_j$, $\Theta(F_j - F_T)$ can be taken as rough approximation of the linear function $F_j/F_{max}$ ($F_{max}$ is the maximum value that $F_j$ can take). Considering $\pi_i^{Poc\delta}(t - t_i^{pre})$ as $\pi_i^P$, $\pi_i^P$ can be identified with $F_i$. Accordingly, $\pi_i^{P\Theta}(F_j - F_T)$ $\propto c\delta$ $(t - t_i^{pre})\Theta(F_j - F_T)$, which is a potentiating term (potentiating condition) of mathematical formula (6), can be regarded as approximation of Hebb's rule.

A depression term (depression condition) of mathematical formula (6) may be defined by, for example, mathematical formula (4) as with the first embodiment. In this case, $\Delta w_{ij}$ representing update of the weight $w_{ij}$ is defined by mathematical formula (9) provided below. It should be noted that each of $\eta_{pot}$ and $\eta_{dep}$ is a constant.

$$\Delta w_{ij} = \left\{\eta_{pot}\delta(t - t_i^{pre}) - \eta_{dep}\delta(t - t_j^{post})\right\}\Theta(F_j - F_T) \quad (9)$$

As with the first embodiment, the variable C; may be used. In this case, $\Delta w_{ij}$ is defined by mathematical formula (10) provided below.

$$\Delta w_{ij} = \left\{\eta_{pot}\delta(t - t_i^{pre}) - \eta_{dep}\delta(t - t_j^{post})\right\}\Theta(C_j - \theta_C) \quad (10)$$

Figure 13:
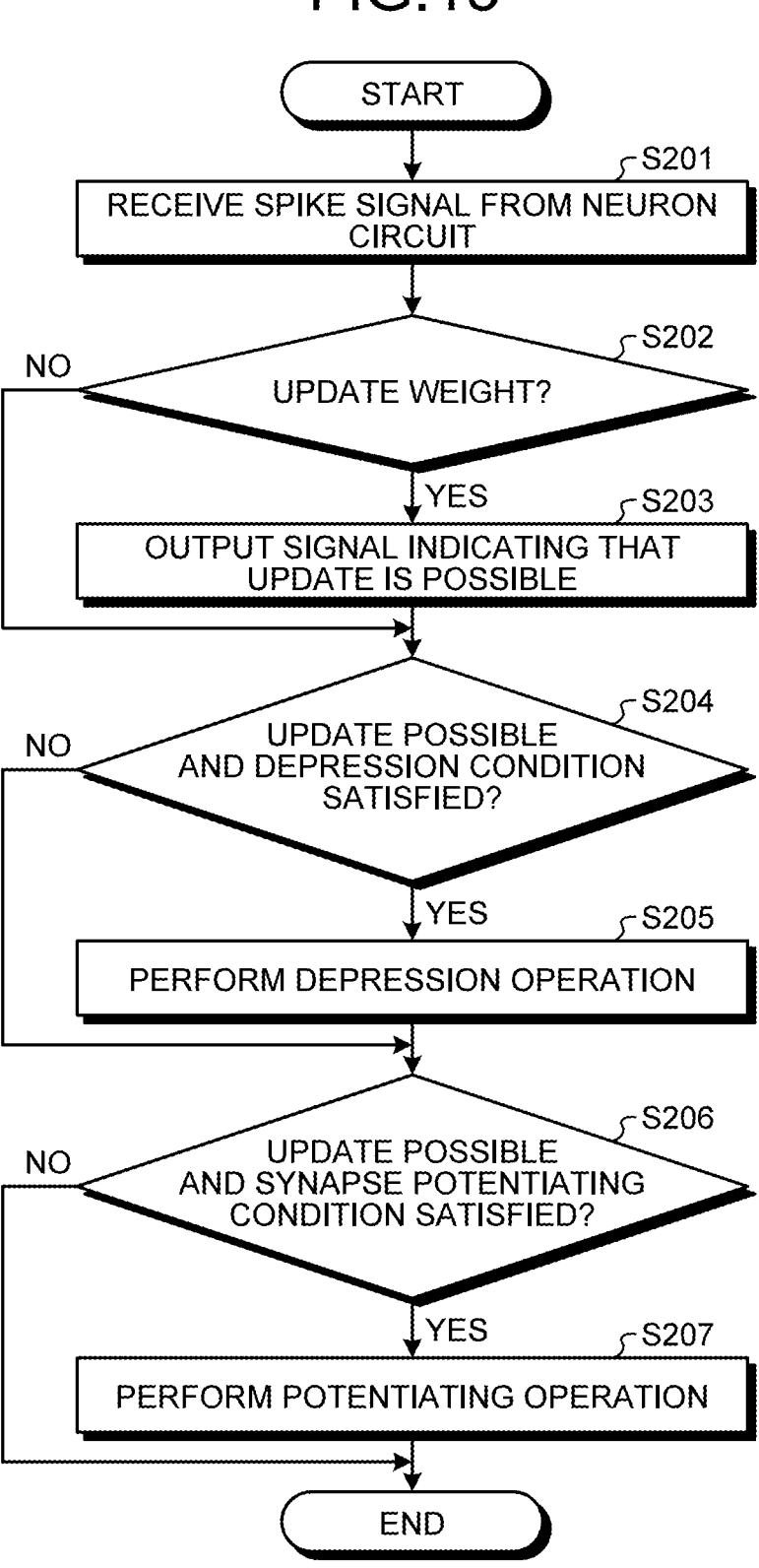
FIG. 13 is a flowchart depicting learning processing of the second embodiment.

The description goes on to learning processing by the spiking neural network device 100-2 configured as described above according to the second embodiment. FIG. 13 is a flowchart depicting an example of the learning processing of the second embodiment.

In the present embodiment, the determination processing in Step S206 is different from the learning processing in Step S106 in FIG. 9 of the first embodiment. Since the other steps (Step S201 to Step S205 and Step S207) denote the same processing as that of the steps (Step S101 to Step S105 and Step S107) in the spiking neural network device 100 according to the first embodiment, the description thereof is omitted.

In Step S206, the synaptic potentiator 140-2 outputs a signal indicating that weight update is possible, and determines whether or not the potentiating condition is satisfied (Step S206).

Figure 14A:
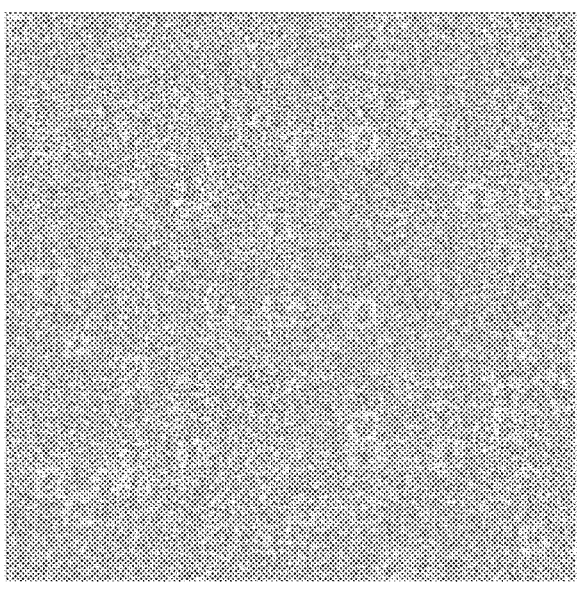
FIG. 14A is a diagram illustrating an example of a learning result of MNIST handwritten characters.
Figure 14B:
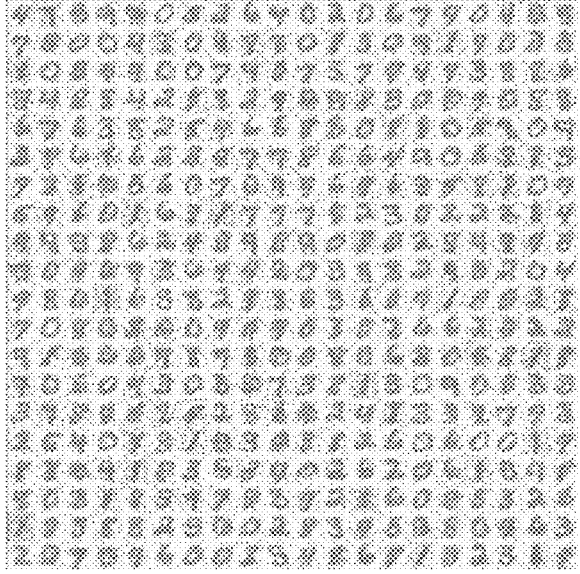
FIG. 14B is a diagram illustrating an example of a learning result of MNIST handwritten characters.
Figure 14C:
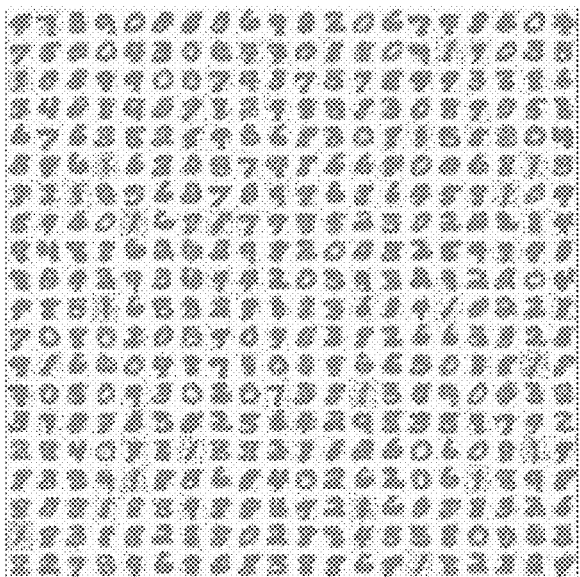
FIG. 14C is a diagram illustrating an example of a learning result of MNIST handwritten characters.

FIGS. 14A to 14C are diagrams illustrating examples of learning results of MNIST handwritten characters by the spiking neural network device 100-2 in the present embodiment. The neural network used herein is similar to that illustrated in FIG. 3. Here, the synapse is a binary synapse with a weight value of only 0 or 1. Therefore, the weight update is processing of changing $w_{ij}$ from 0 to 1 or from 1 to 0 with a probability proportional to $\Delta w_{ij}$, instead of updating the weight by $\Delta w_{ij}$. The synaptic potentiator 140-2 uses the potentiating condition of STDP, and the synaptic depressor 150 uses the depression condition defined by mathematical formula (10) above.

As illustrated in FIGS. 14A to 14C, as the number of times of learning increases, the weight distribution that was random at the beginning gradually forms a pattern. After 60,000 times of learning (FIG. 14C), the character recognition rate in the neural network using the weight distribution becomes 81.6%. As illustrated in FIGS. 14A to 14C, the application of the present embodiment enables learning of a blank part of the character pattern. In other words, the present embodiment has effects comparable to the synaptic normalization in the second term of mathematical formula (5), and the synaptic weight corresponding to the blank part is depressed to zero.

Figure 15:
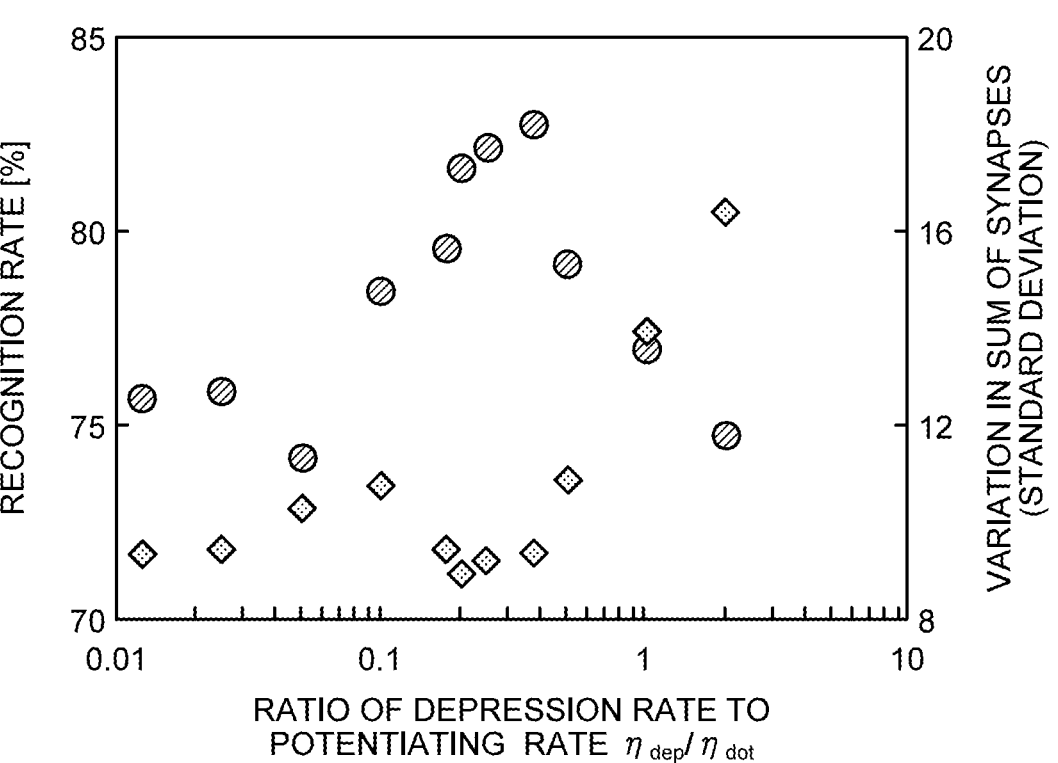
FIG. 15 is a diagram illustrating a recognition rate and a standard deviation of a sum of weights relative to a ratio of a potentiating rate and a depression rate.

Effective implementation of the synaptic normalization requires keeping a balance between the potentiating operation and the depression operation. FIG. 15 is a graph plotting a recognition rate after learning of MNIST handwritten characters and a standard deviation of a sum of weights for each neuron circuit 110 with respect to a ratio of $\eta_{dep}$ (corresponding to depression rate) to $\eta_{pot}$ (corresponding to potentiating rate). The recognition rate takes a maximum value when the ratio is around 0.2 to 0.4, and the standard deviation takes a minimum value in the same range (ratio 0.2 to 0.4). The fact that the standard deviation takes the minimum value means that variation in the sum of the weights of the synaptic element 120 connected to the neuron circuit 110 is small and normalized. In other words, it is shown that the recognition rate by learning improves in a case where a balance between the potentiating operation and the depression operation is kept and the synaptic normalization is achieved.

As described above, in the spiking neural network device according to the second embodiment, not only the depression operation but also the potentiating operation is performed in a case where it is determined that synapse update is possible. This makes it possible to implement the synaptic normalization more efficiently.

Third Embodiment

In the third embodiment, a configuration example of a circuit for implementing the second embodiment is described.

Figure 16:
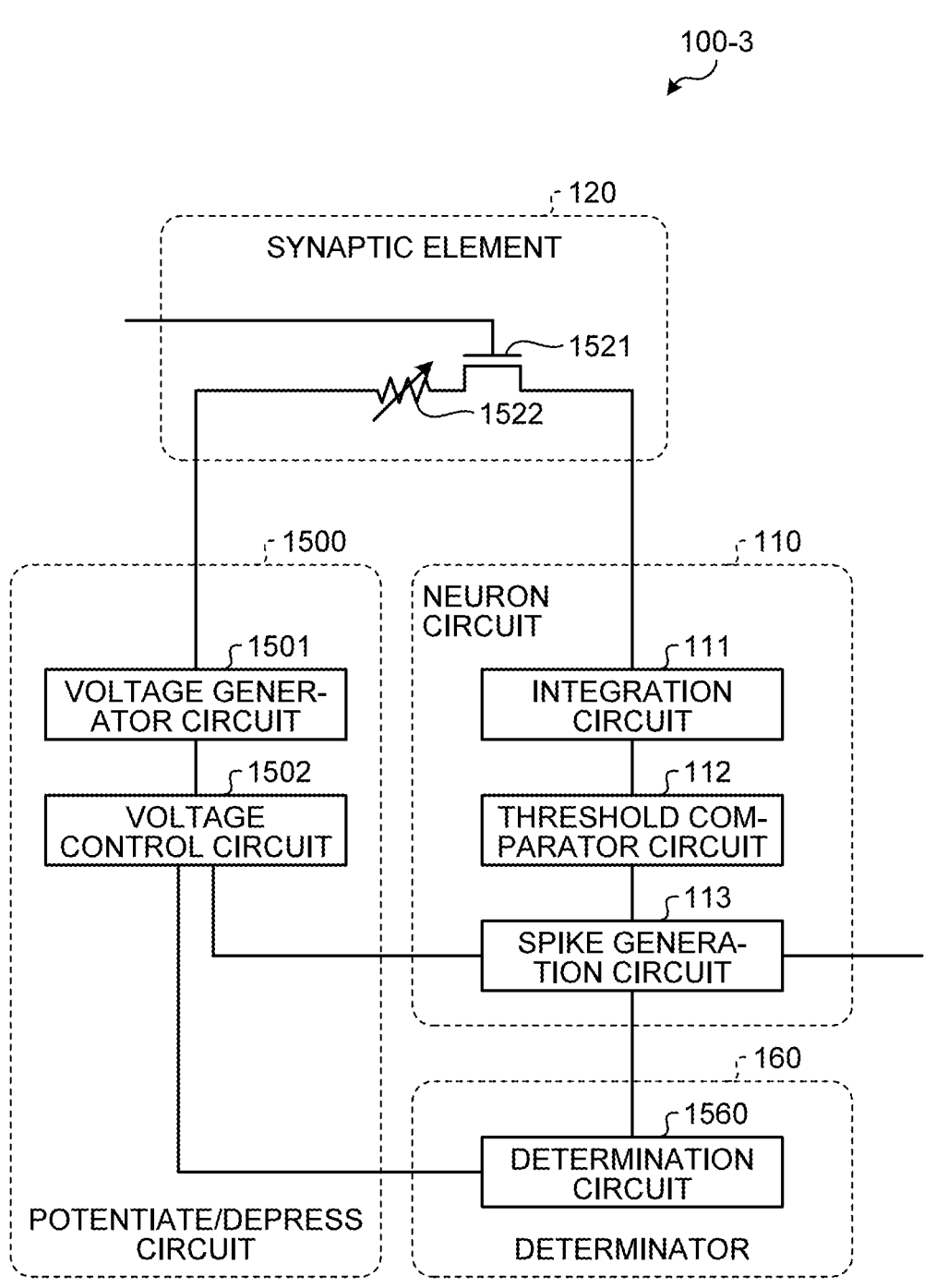
FIG. 16 is a diagram illustrating an example of the circuit configuration of a spiking neural network device according to a third embodiment.

FIG. 16 is a diagram illustrating an example of the circuit configuration of a spiking neural network device 100-3 according to the third embodiment. As illustrated in FIG. 16, the spiking neural network device 100-3 of the present embodiment includes the synaptic element 120, the neuron circuit 110, a potentiate/depress circuit 1500, and the determinator 160.

The potentiate/depress circuit 1500 corresponds to a configuration having the functions of both of the synaptic potentiator 140-2 and the synaptic depressor 150 of the second embodiment.

The synaptic element 120 includes a metal oxide semiconductor (MOS) transistor 1521 and a memristor 1522. The MOS transistor 1521 is turned on in response to a spike voltage inputted. The memristor 1522 is an example of the weight storage 121. The weight storage 121 can be implemented as a two-terminal storage element that can store information (weight value) as a resistance value like the memristor 1522. Hereinafter, the description is provided assuming that the memristor 1522 is a two-terminal storage element that can take a low resistance state (SET state) and a high resistance state (RESET state).

The configuration example of the circuit of the neuron circuit 110 is similar to that illustrated in FIG. 7. The determinator 160 includes a determination circuit 1560. The potentiate/depress circuit 1500 includes a voltage generator circuit 1501 and a voltage control circuit 1502.

Figure 17:
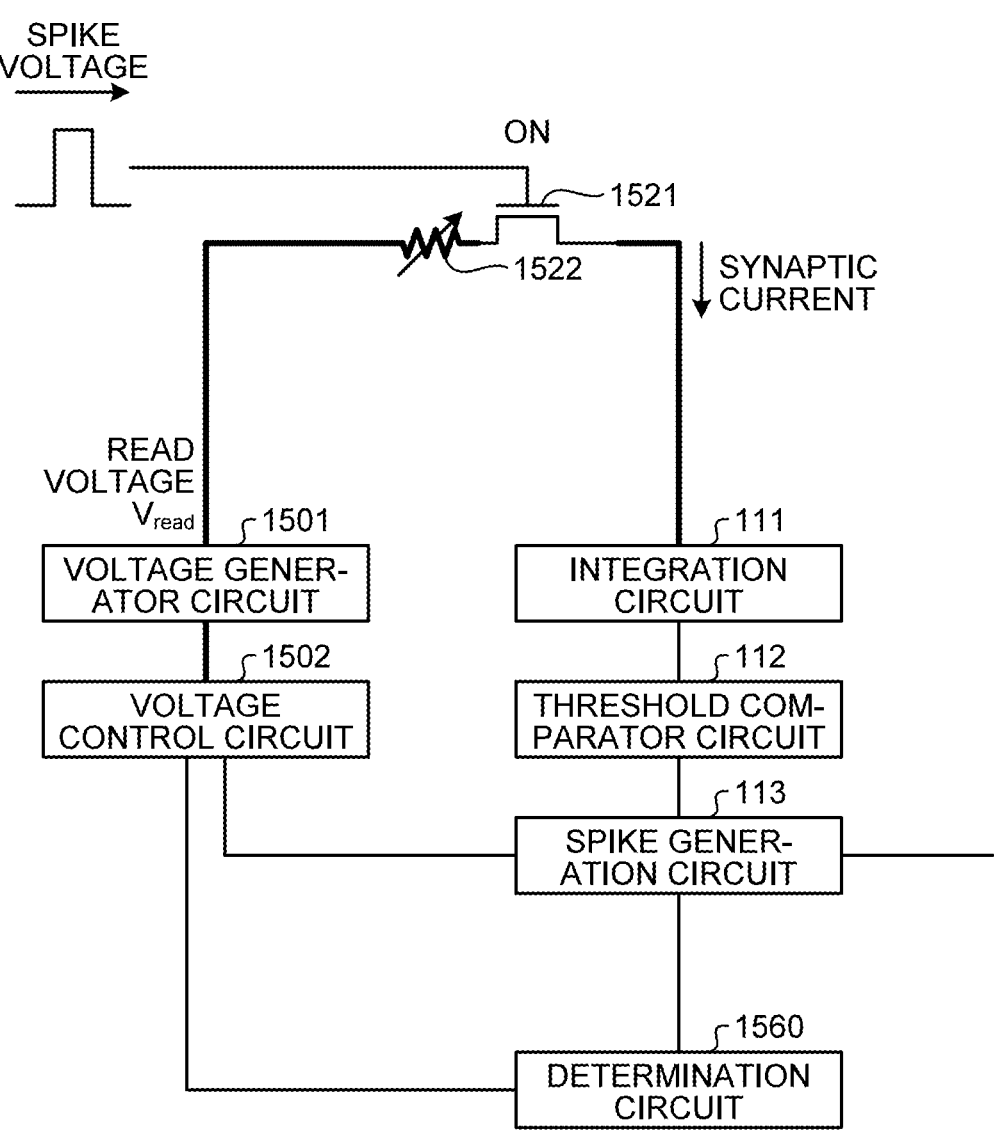
FIG. 17 is a diagram for explaining operation of the spiking neural network device according to the third embodiment.
Figure 18:
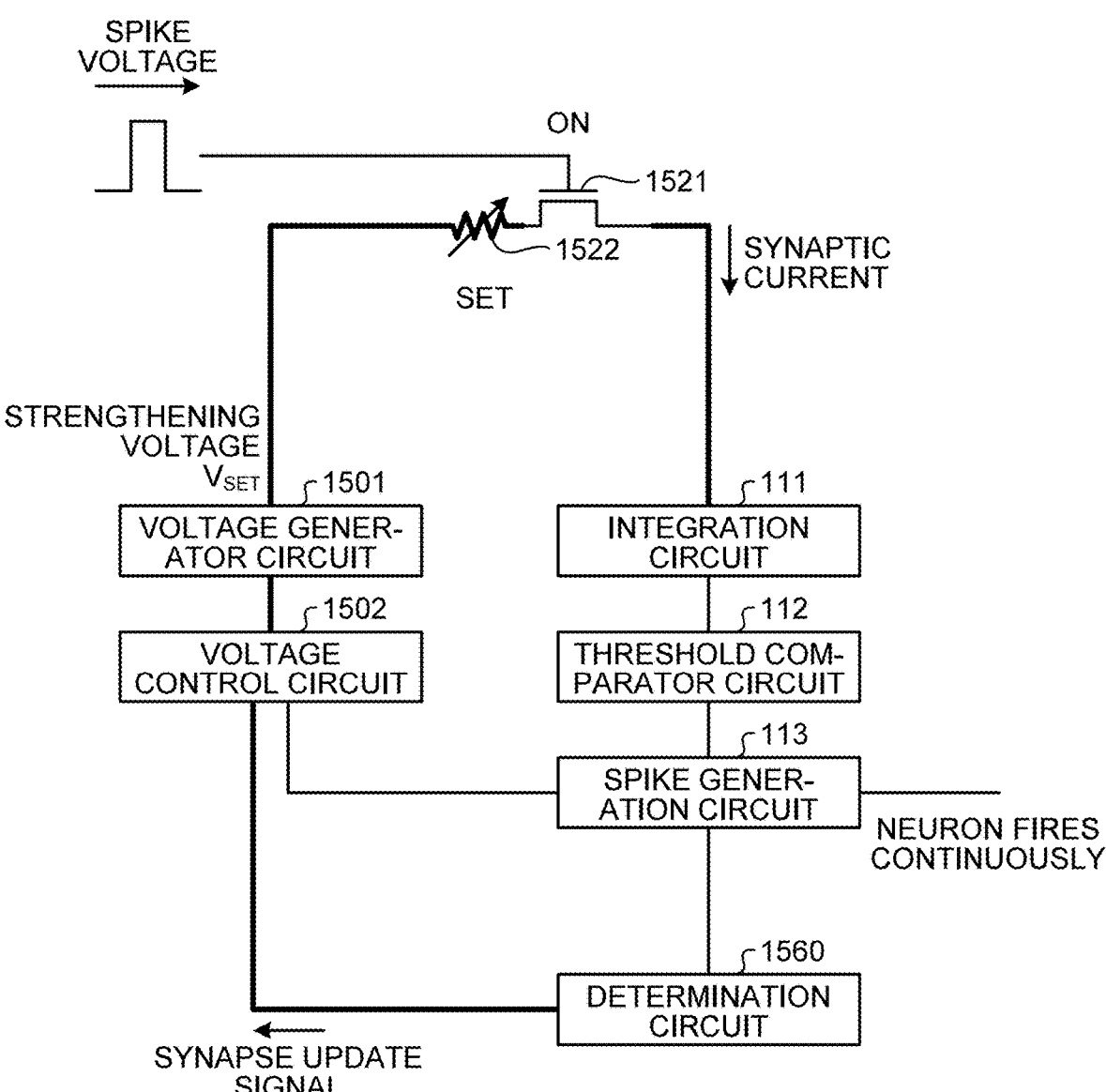
FIG. 18 is a diagram for explaining operation of the spiking neural network device according to the third embodiment.
Figure 19:
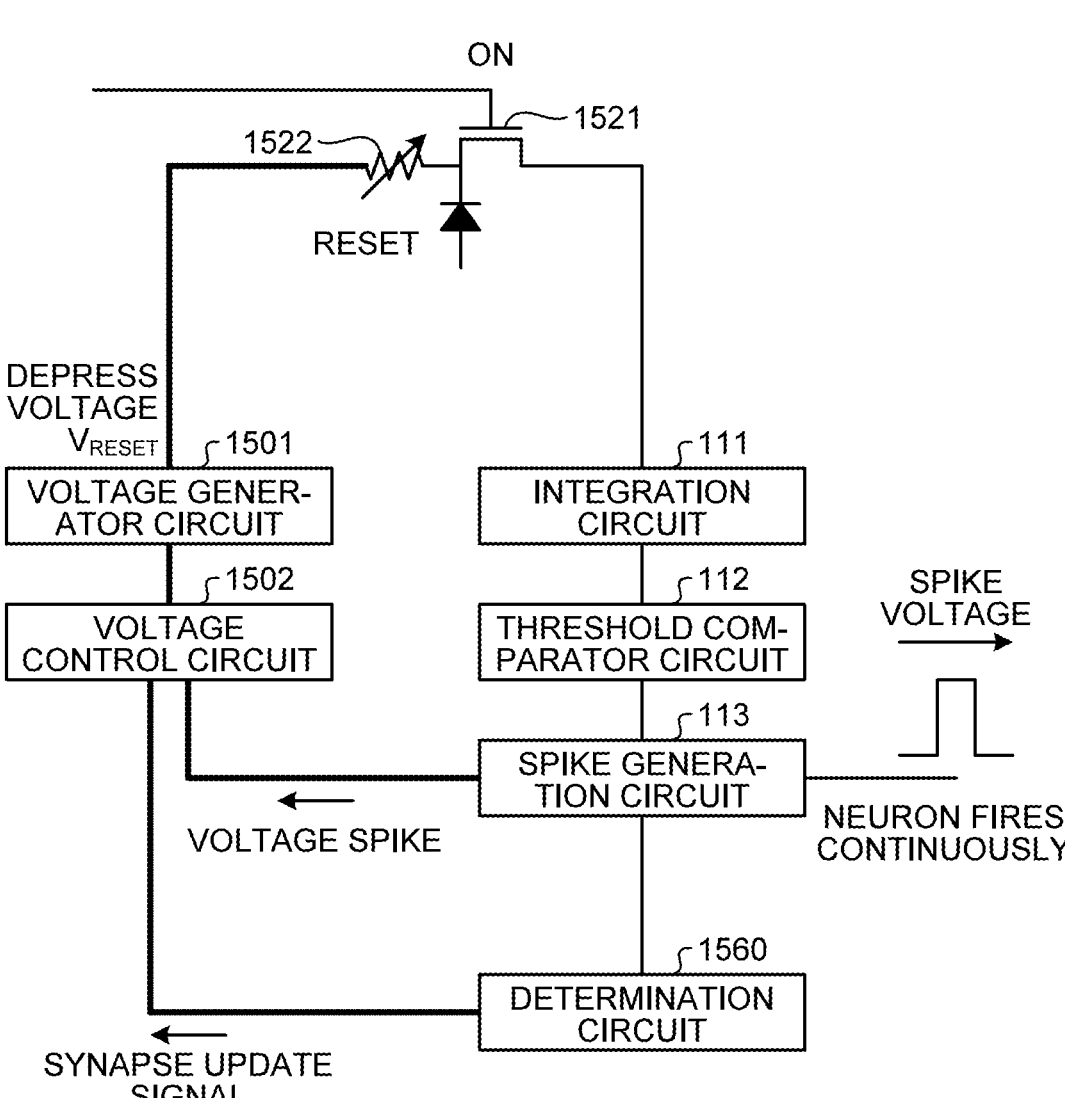
FIG. 19 is a diagram for explaining operation of the spiking neural network device according to the third embodiment.

FIGS. 17 to 19 are diagrams for explaining operation of the spiking neural network device 100-3 configured as described above.

As illustrated in FIG. 17, in a normal state, a read voltage $V_{read}$ is applied to one terminal of the memristor 1522, and the MOS transistor 1521 is turned on in response to a spike voltage inputted. In the following description, the MOS transistor 1521 is assumed to be an N-type transistor. Since the MOS transistor 1521 is an N-type transistor, the spike voltage is a positive voltage. It is further assumed that the read voltage $V_{read}$ is also a positive voltage. If the memristor 1522 is in the SET state, the read voltage $V_{read}$ is converted to a synaptic current to flow into the neuron circuit 110 (integration circuit 111). If the memristor 1522 is in the RESET state, the synaptic current is negligibly small.

The neuron circuit 110 includes the integration circuit 111, the threshold comparator circuit 112, and the spike generation circuit 113. The integration circuit 111 integrates a synaptic current generated by the synaptic element 120. The threshold comparator circuit 112 compares the integrated value (membrane potential) with a threshold. The spike generation circuit 113 fires when the membrane potential exceeds the threshold, and outputs a spike voltage.

As illustrated in FIG. 18, when the neuron circuit 110 continuously fires and the firing frequency is equal to or higher than the threshold, the determination circuit 1560 transfers a synapse update signal to the voltage control circuit 1502. The synapse update signal corresponds to a signal (signal indicating that synapse update is possible) indicating that the weight is to be updated.

The voltage control circuit 1502, which has received the synapse update signal, transfers the signal to output a potentiating voltage $V_{SET}$ to the voltage generator circuit 1501. The voltage generator circuit 1501, which has received the signal, outputs a potentiating voltage $V_{SET}$. The potentiating voltage $V_{SET}$ is a positive voltage and the relationship of $V_{SET} > V_{read}$ is established. In this state, when a spike voltage is inputted to the synaptic element 120, the MOS transistor 1521 is turned on, and the potentiating voltage $V_{SET}$ is applied to both ends of the memristor 1522.

The memristor 1522 is designed to transition to the SET state by the potentiating voltage $V_{SET}$ if the resistance state is the RESET state.

If it is already in the SET state, the resistance state does not change, and the synaptic current flows into the neuron circuit 110. Here, by appropriately designing the sizes of the memristor 1522 and the MOS transistor 1521 and appropriately setting the amplitude of the spike voltage, the potentiating voltage $V_{SET}$, and the read voltage $V_{read}$, the MOS transistor 1521 can operate in a saturated state even when any of the read voltage $V_{read}$ and the potentiating voltage $V_{SET}$ is applied in the SET state of the memristor 1522. In this case, the synaptic current is determined depending on a saturation current of the MOS transistor 1521. Accordingly, even in a case where any of the read voltage $V_{read}$ and the potentiating voltage $V_{SET}$ is applied, the same synaptic current flows. In other words, even when the potentiating operation is performed, the operation of the potentiating operation does not affect the operation of the neuron circuit 110. This is an important property in online learning in which learning is performed through recognition operation or inference operation, and this is different from conventional deep learning techniques in which the recognition operation or the inference operation and learning are distinguished.

As illustrated in FIG. 19, when the firing frequency of the neuron circuit 110 becomes equal to or higher than a certain value, the determination circuit 1560 transfers a synapse update signal to the voltage control circuit 1502. On the other hand, when the spike generation circuit 113 generates a spike voltage, the spike voltage is transferred to the voltage control circuit 1502. The voltage control circuit 1502 receives the synapse update signal, and when the spike voltage is received during that, the voltage control circuit 1502 transfers the signal to output a depressing voltage $V_{RESET}$ to the voltage generator circuit 1501. The voltage generator circuit 1501, which has received the signal, outputs the depressing voltage $V_{RESET}$. The depressing voltage $V_{RESET}$ is a negative voltage. In this state, if the MOS transistor 1521 is off, the depressing voltage $V_{RESET}$ is applied to a terminal of the memristor 1522 on the voltage generator circuit 1501 side.

On the other hand, a terminal on the MOS transistor 1521 side is connected to a source drain electrode of the MOS transistor 1521. Therefore, in a case where the MOS transistor 1521 is formed on a bulk substrate, the source drain electrode forms an n/p type diode with respect to the substrate. Therefore, in a case where the depressing voltage $V_{RESET}$, which is a negative voltage, is applied to the voltage generator circuit 1501 side of the memristor 1522, the terminal on the MOS transistor 1521 side is regarded as being grounded through the diode. If $|V_{RESET}|$ is set appropriately, the memristor 1522 in the SET state transitions to the RESET state. If it is already in the RESET state, the resistance state does not change and no current flows.

In a case where a spike voltage is inputted at the application of the depressing voltage $V_{RESET}$, the MOS transistor 1521 is turned on; however, since the potential of the input unit of the neuron circuit 110 is grounded, the voltage applied to the memristor 1522 is not affected. Further, since there is a non-response period immediately after the firing of the neuron circuit 110, there is no influence on the neuron operation.

In the foregoing description, the MOS transistor 1521 is formed on the bulk substrate. In a case where the source drain electrode does not form a diode with respect to the ground, for example, where the MOS transistor 1521 is formed on a silicon on insulator (SOI) substrate, a diode (diode connecting the MOS transistor 1521 and the memristor 1522) may be connected to the source drain electrode separately. This enables the memristor 1522 to transition to the RESET state.

Figure 20:
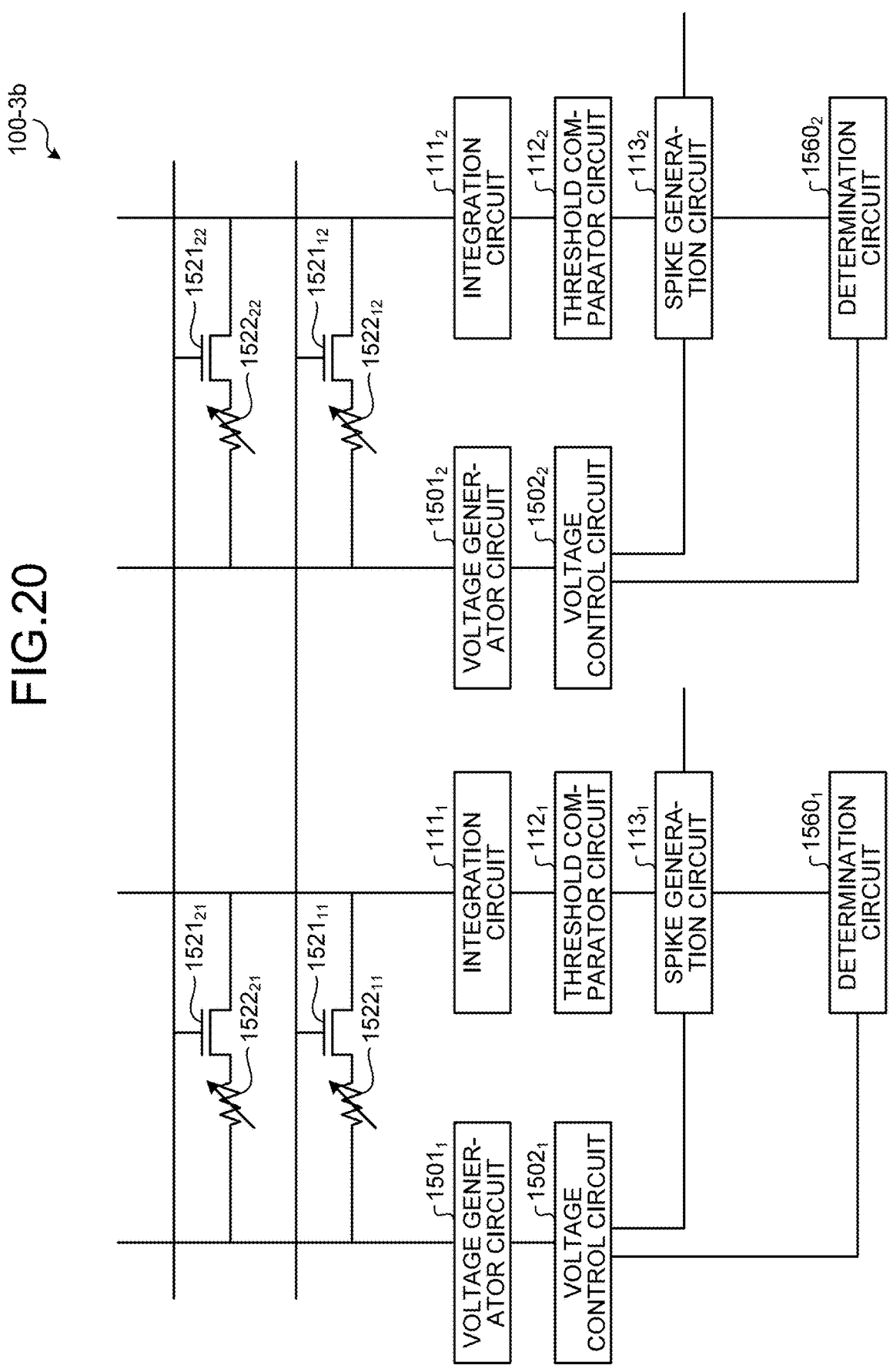
FIG. 20 is a diagram illustrating another example of the configuration of a spiking neural network device.

As with FIG. 12 of the second embodiment, a plurality of synaptic elements may be connected to one neuron circuit 110. FIG. 20 is a diagram illustrating an example of the configuration of a spiking neural network device 100-3*b* as configured above. FIG. 20 illustrates an example of the configuration of the spiking neural network device 100-3*b* in which a plurality of neuron circuits 110, each of which is connected to a plurality of synaptic elements, is arranged in parallel. While FIG. 20 illustrates an example in which two sets of a plurality of synaptic elements and the neuron circuit 110 are arranged side by side, three or more sets thereof may be arranged side by side.

A voltage generator circuit 15011 and a voltage control circuit 15021 correspond to the potentiate/depress circuit 1500 included in the set on the left side. An integration circuit 1111, a threshold comparator circuit 1121, and a spike generation circuit 1131 correspond to the neuron circuit 110 included in the set on the left side. MOS transistors 152111 and 152121, and memristors 152211 and 152221 correspond to the two synaptic elements 120 included in the set on the left side. A determination circuit 15601 corresponds to the set on the left side.

Similarly, a voltage generator circuit 15012 and a voltage control circuit 15022 correspond to the potentiate/depress circuit 1500 included in the set on the right side. An integration circuit 1112, a threshold comparator circuit 1122, and a spike generation circuit 1132 correspond to the neuron circuit 110 included in the set on the right side. MOS transistors 152112 and 152122, and the memristors 152212 and 152222 correspond to the two synaptic elements 120 included in the set on the right side. A determination circuit 15602 corresponds to the set on the right side. It is noted that each set may include three or more synaptic elements 120.

As described above, according to the first through third embodiments, it is possible to learn information having a low spike density without increasing the size of a device and increasing the power required for learning.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A spiking neural network device comprising:

a synaptic circuit configured to have a variable weight, and configured to output, in response to input of a first spike signal, a synaptic signal whose intensity is adjusted in accordance with the weight;

a neuron circuit configured to input the synaptic signal and output a second spike signal in a case where an integrated value of the inputted synaptic signal exceeds a first threshold;

a determination circuit configured to determine whether or not the weight is to be updated on a basis of an output frequency that is a frequency of outputting the second spike signal by the neuron circuit, the output frequency being defined with a variable that increases each time the neuron circuit outputs the second spike signal;

a synaptic depression circuit configured to perform depression operation for depressing the weight in a case where it is determined that the weight is to be updated; and a synaptic potentiation circuit configured to perform potentiating operation for potentiating the weight, wherein the determination circuit determines that the weight is to be updated in a case where the output frequency is equal to or greater than a second threshold.

2. The spiking neural network device according to claim 1, wherein the output frequency decreases with time.

3. The spiking neural network device according to claim 1, wherein the synaptic depression circuit performs the depression operation in a case where it is determined that the weight is to be updated and the neuron circuit outputs the second spike signal.

4. The spiking neural network device according to claim 1, wherein the synaptic potentiation circuit performs the potentiating operation in a case where a predetermined potentiating condition is satisfied.

5. The spiking neural network device according to claim 4, wherein the synaptic potentiation circuit performs the potentiating operation in a case where the determination circuit determines that the weight is to be updated and the potentiating condition is satisfied.

6. The spiking neural network device according to claim 1, wherein the synaptic circuit includes a storage element for storing a value of the weight by a resistance value and a metal oxide semiconductor (MOS) transistor.

7. The spiking neural network device according to claim 6, wherein the storage circuit has a plurality of resistance states and transition between the plurality of resistance states is stochastic.

8. The spiking neural network device according to claim 6, wherein the synaptic circuit further includes a diode for connecting the MOS transistor and the storage element to each other.

9. A learning method of a spiking neural network device, the spiking neural network device including a synaptic circuit configured to have a variable weight, and configured to output, in response to input of a first spike signal, a synaptic signal whose intensity is adjusted in accordance with the weight, and a neuron circuit configured to input the synaptic signal and output a second spike signal in a case where an integrated value of the inputted synaptic signal exceeds a first threshold, the learning method comprising:

a determination step of determining whether or not the weight is to be updated on a basis of an output frequency that is a frequency of outputting the second spike signal by the neuron circuit, the output frequency being defined with a variable that increases each time the neuron circuit outputs the second spike signal;

a synapse depressing step of performing depression operation for depressing the weight in a case where it is determined that the weight is to be updated; and a synapse potentiating step of performing potentiating operation for potentiating the weight, wherein the determination step includes a step of determining that the weight is to be updated in a case where the output frequency is equal to or greater than a second threshold.

* * * * *